(12) United States Patent
Harano et al.

(10) Patent No.: US 10,740,045 B2
(45) Date of Patent: Aug. 11, 2020

(54) PRINT CONTROL APPARATUS, PRINT APPARATUS, METHODS OF CONTROLLING THE APPARATUSES, AND STORAGE MEDIUM STORING INSTRUCTIONS, THAT PROVIDE FEED CONTROL TO INHIBIT FEEDING OF SHEETS FROM ONLY A SELECTED SHEET FEEDER

(71) Applicant: CANON KABUSHIKI KAISHA, Tokyo (JP)

(72) Inventors: Yuzo Harano, Sagamihara (JP); Hideaki Ooba, Yokohama (JP); Aya Ito, Tokyo (JP); Nobuhiro Kawamura, Nagareyama (JP); Yusuke Kimura, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/371,399

(22) Filed: Apr. 1, 2019

(65) Prior Publication Data
US 2019/0310805 A1    Oct. 10, 2019

(30) Foreign Application Priority Data
Apr. 6, 2018 (JP) ................ 2018-074040

(51) Int. Cl.
*G06F 3/12* (2006.01)

(52) U.S. Cl.
CPC .......... *G06F 3/1204* (2013.01); *G06F 3/1255* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 2004/0141203 A1* | 7/2004 | Honma | G06F 3/1205 358/1.15 |
| 2009/0184456 A1* | 7/2009 | Nishii | G06K 15/005 271/9.01 |
| 2015/0062622 A1* | 3/2015 | Ito | B65H 1/266 358/1.15 |

FOREIGN PATENT DOCUMENTS

JP        4556588 B2        10/2010

\* cited by examiner

*Primary Examiner* — Henok Shiferaw
(74) *Attorney, Agent, or Firm* — Rossi, Kimms & McDowell LLP

(57) ABSTRACT

The present invention provides a print control apparatus that controls a print apparatus. The print control apparatus displays pieces of identification information of a plurality of sheet feeders available in the print apparatus, and designates inhibition of sheet feed from sheet feeders other than a sheet feeder selected by a user among the displayed pieces of identification information of the plurality of sheet feeders.

19 Claims, 17 Drawing Sheets

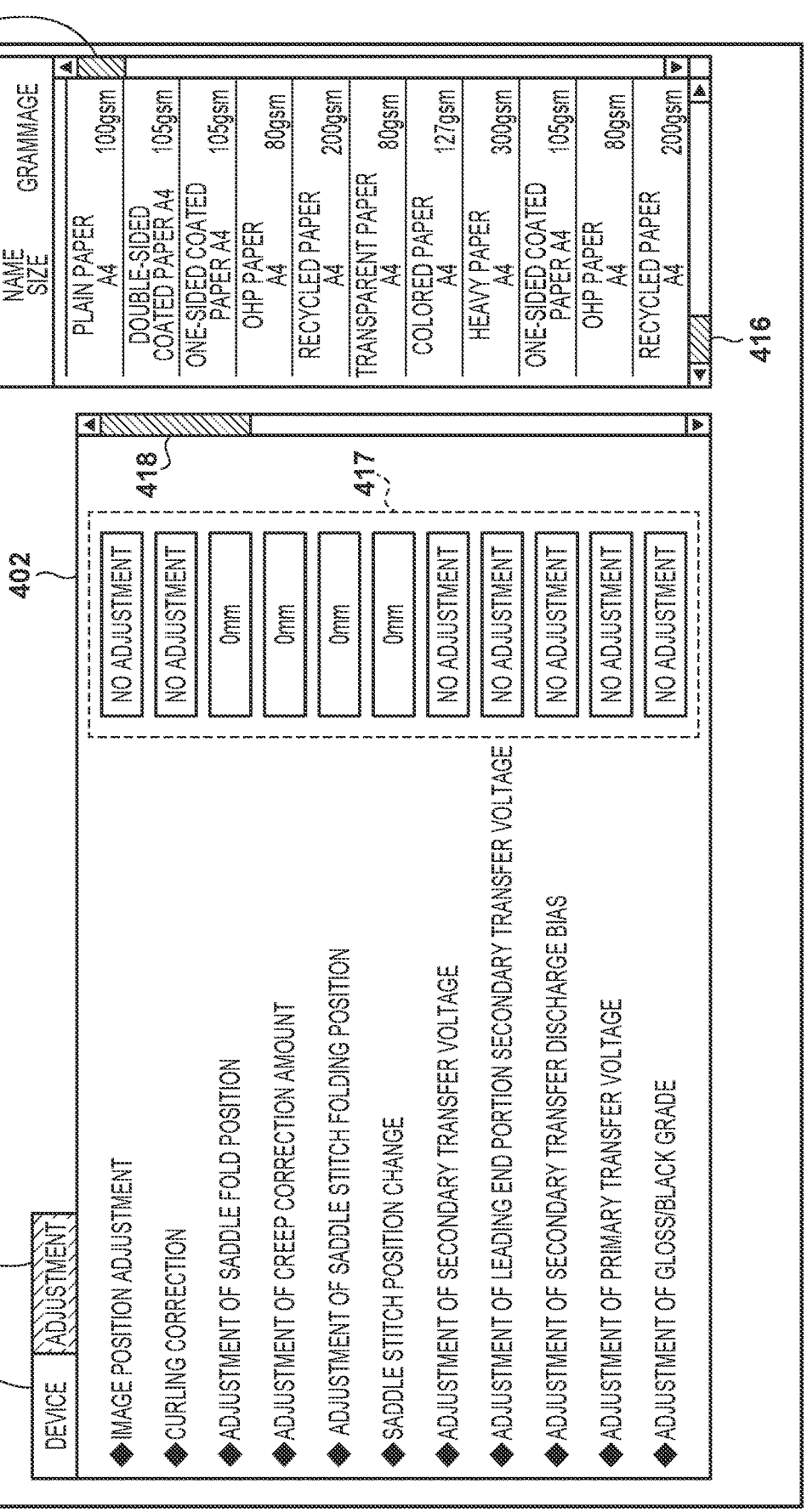

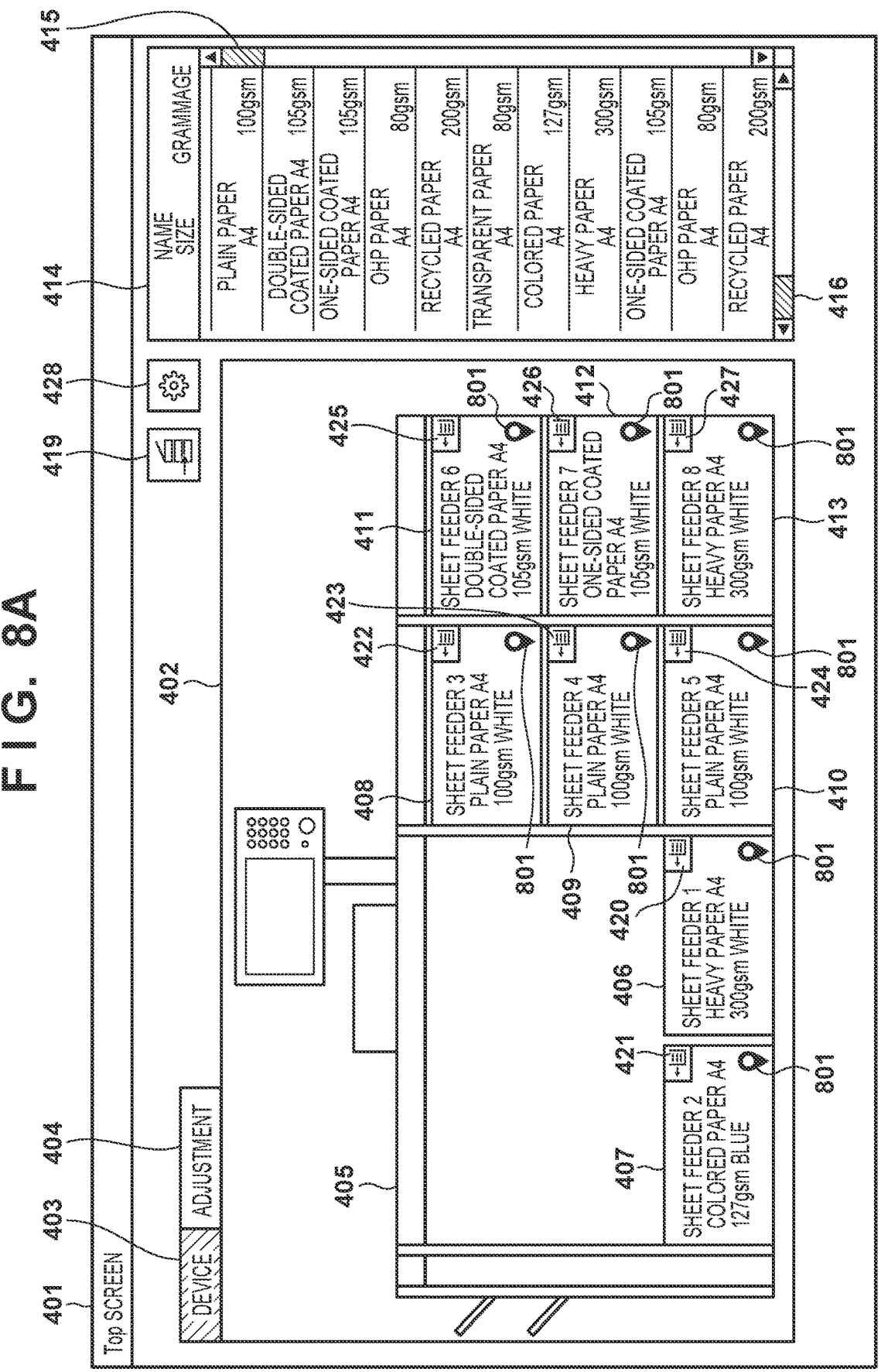

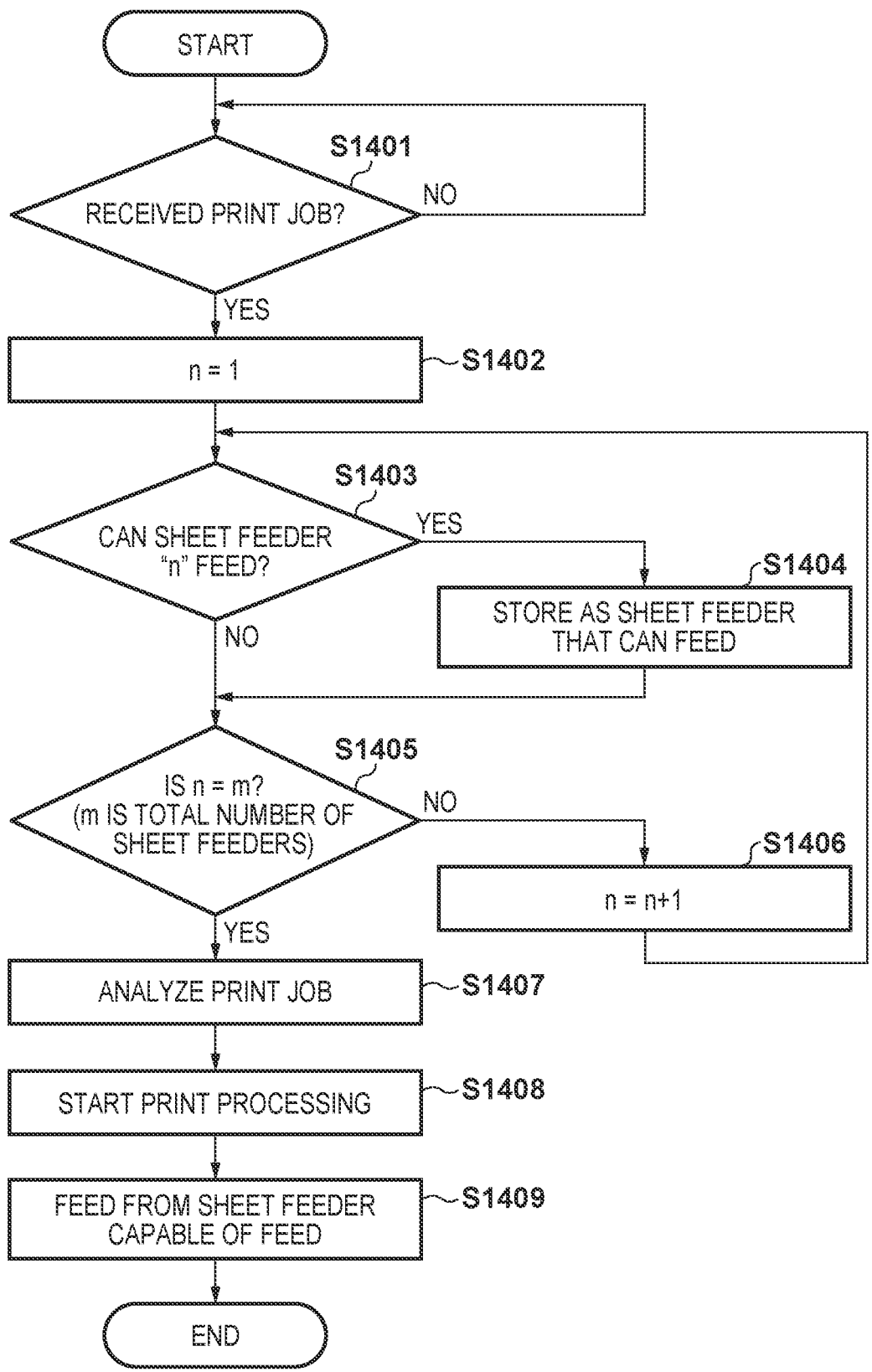

PRINT CONTROL APPARATUS, PRINT APPARATUS, METHODS OF CONTROLLING THE APPARATUSES, AND STORAGE MEDIUM STORING INSTRUCTIONS, THAT PROVIDE FEED CONTROL TO INHIBIT FEEDING OF SHEETS FROM ONLY A SELECTED SHEET FEEDER

BACKGROUND OF THE INVENTION

Field of the Invention

The present invention relates to a print control apparatus, a print apparatus, methods of controlling the apparatuses, and a storage medium.

Description of the Related Art

A print apparatus included in a print system feeds a sheet from a sheet feeder such as a feed tray on which sheets are stacked or a feeding device connected to the print apparatus. The print apparatus selects a sheet feeder serving as a feeding source of sheets in accordance with information designated by a print job, and feeds a sheet from the selected sheet feeder.

When performing printing, especially in print operations in the commercial printing field, a user sometimes wants to perform printing by feeding a sheet from a sheet feeder on which specific sheets are stacked. In this case, to reliably feed a sheet from this sheet feeder, for example, the remaining sheet feeders are pulled out so as not to use them, or sheets stacked on the remaining sheet feeders are removed. It is described in Japanese Patent No. 4556588 that a sheet is fed from neither a feed tray nor a feeding device until a predetermined requirement is satisfied after a user closes the feed tray or the feeding device.

When the user wants to feed a sheet from a sheet feeder he/she wants and perform printing, he/she needs to set all the remaining sheet feeders one by one so as not to feed a sheet from them. This puts a lot of labor on the user. As the number of sheet feeders increases, the user labor also increases. For example, in a print apparatus with ten sheet feeders, the user performs an operation for physically or functionally disabling feed on each of the remaining nine sheet feeders. That is, letting N be the number of sheet feeders of the print apparatus, the user needs to perform (N-1) times the operation for disabling feed. These operations increase the labor for feeding a sheet from only a predetermined sheet feeder.

SUMMARY OF THE INVENTION

An aspect of the present invention is to eliminate the above-mentioned problem with conventional technology.

The feature of the present invention is to provide a technique for easily setting a sheet feeder serving as a feed target and inhibition of feed from the remaining sheet feeders in a print apparatus.

According to a first aspect of the present invention, there is provided a print control apparatus that controls a print apparatus, comprising: a display; a memory device that stores instructions; and at least one processor that executes the instructions stored in the memory device to cause the print control apparatus to function as: a display control unit that causes the display to display pieces of identification information of a plurality of sheet feeders available in the print apparatus; and a designation unit that designates inhibition of feed from sheet feeders other than a sheet feeder selected by a user among the pieces of identification information of the plurality of sheet feeders displayed on the display.

According to a second aspect of the present invention, there is provided a print apparatus comprising: a display; a printer engine; a memory device that stores instructions; and at least one processor that executes the instructions stored in the memory device to cause the print apparatus to function as: a display control unit that causes the display to display pieces of identification information of a plurality of sheet feeders available in the print apparatus; a setting unit that sets, as a feeding source of a sheet based on designation from a user, a sheet feeder identified by identification information among the pieces of identification information displayed on the display, and inhibits feed from sheet feeders other than the sheet feeder set as the feeding source; and a control unit that causes the printer engine to execute printing by feeding a sheet from the sheet feeder serving as the feeding source set by the setting unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B depict views each showing an example of a top screen displayed on a display device by a sheet management application running on the print control apparatus according to the first embodiment;

FIGS. 8A and 8B depict views each showing still another example of the top screen displayed on the display device by the sheet management application running on the print control apparatus according to the first embodiment;

FIG. 14 is a flowchart for describing print processing by the image forming apparatus according to the embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
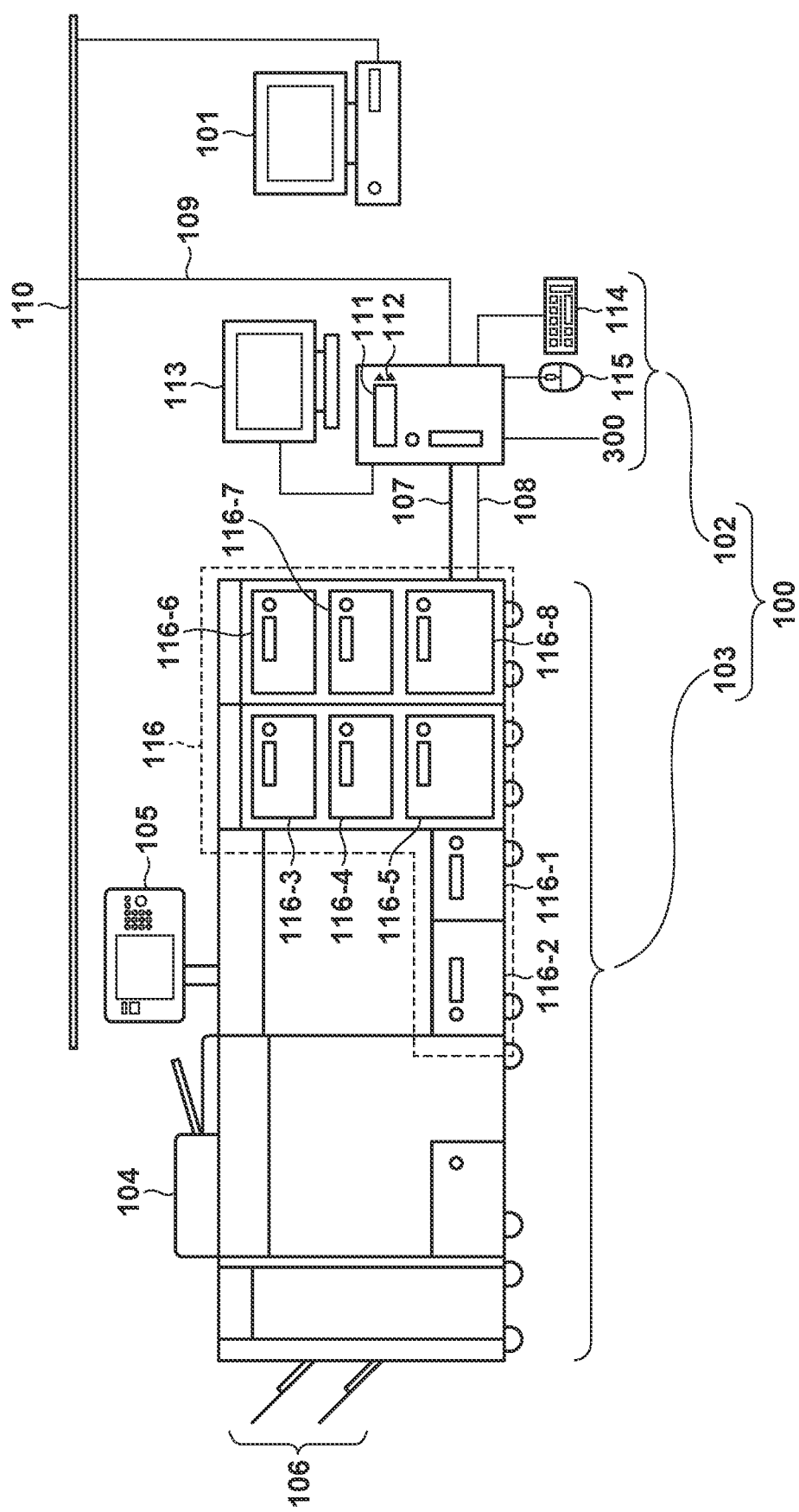
FIG. 1 depicts a view for explaining the overall arrangement of a print system according to the first embodiment of the present invention.

FIG. 1 depicts a view for explaining the overall arrangement of a print system 100 according to the first embodiment of the present invention.

The print system 100 includes an image forming apparatus 103 and a print control apparatus 102. The print system 100 is connected to a client computer 101 to be able to communicate with each other via a network 110. The client computer 101 and the print control apparatus 102 are connected to be able to communicate with each other via a cable 109 and the network (LAN) 110. The print control apparatus 102 and the image forming apparatus 103 are connected via a video cable 107 and a control cable 108. In the first embodiment, the image forming apparatus 103 is not directly connected to the network 110 and communicates with the client computer 101 via the print control apparatus 102. Note that the image forming apparatus 103 may be connected to the network 110 directly. That is, the image forming apparatus 103 may include the function of the print control apparatus 102 and be connected to the client computer 101 directly to be able to communicate with each other.

The client computer 101 activates an application and gives a print instruction or the like to the print system 100. The print control apparatus 102 performs image processing in cooperation with the image forming apparatus 103. The image forming apparatus 103 is a multi-function peripheral having various functions and can print by performing image processing on image data received from the client computer 101 or the print control apparatus 102. Also, the image forming apparatus 103 can print based on image data obtained by reading an original by a scanner unit 104 (copy function), or transmit image data to a shared folder. When scanning and reading an original by the scanner unit 104, various instructions are accepted from a user via various keys of a console unit 105. The console unit 105 displays various kinds of information such as a scan state via a display panel having a touch panel function. A discharge unit 106 receives a sheet bearing a formed (printed) image and discharges it.

A controller 300 controls the operation of the print control apparatus 102. A display unit 111 displays information of the print control apparatus 102. Operation buttons 112 are hardware console units of the print control apparatus 102. The user operates the operation buttons 112 to operate the information displayed on the display unit 111. The information displayed on the display unit 111 is used to display the minimum information (power supply operation and confirmation of an IP address) required to operate the print control apparatus 102. A display device 113 is an external display device connected to the print control apparatus 102 and is a display device such as a liquid crystal monitor. A keyboard 114 and a pointing device 115 are further connected to the print control apparatus 102.

In the first embodiment, the print system 100 will be described as a system independent of the print control apparatus 102 and the image forming apparatus 103. However, the image forming apparatus 103 may include the functions of the print control apparatus 102, and the print control apparatus 102 may not be arranged physically. An arrangement is also possible in which the display device 113 has a coordinate input device function like a touch pad and serves as the function of the pointing device 115. Sheet feeders (sheet feed cassette) 116-1 to 116-8 (to be referred to as sheet feeders 116 collectively) are devices in which sheets used for printing are stored. When executing printing, one feeding device is selected and a sheet is fed from the selected feeding device. Note that the number of sheet feeders is increased or decreased in accordance with the arrangement of options connected to the image forming apparatus 103.

Figure 2:
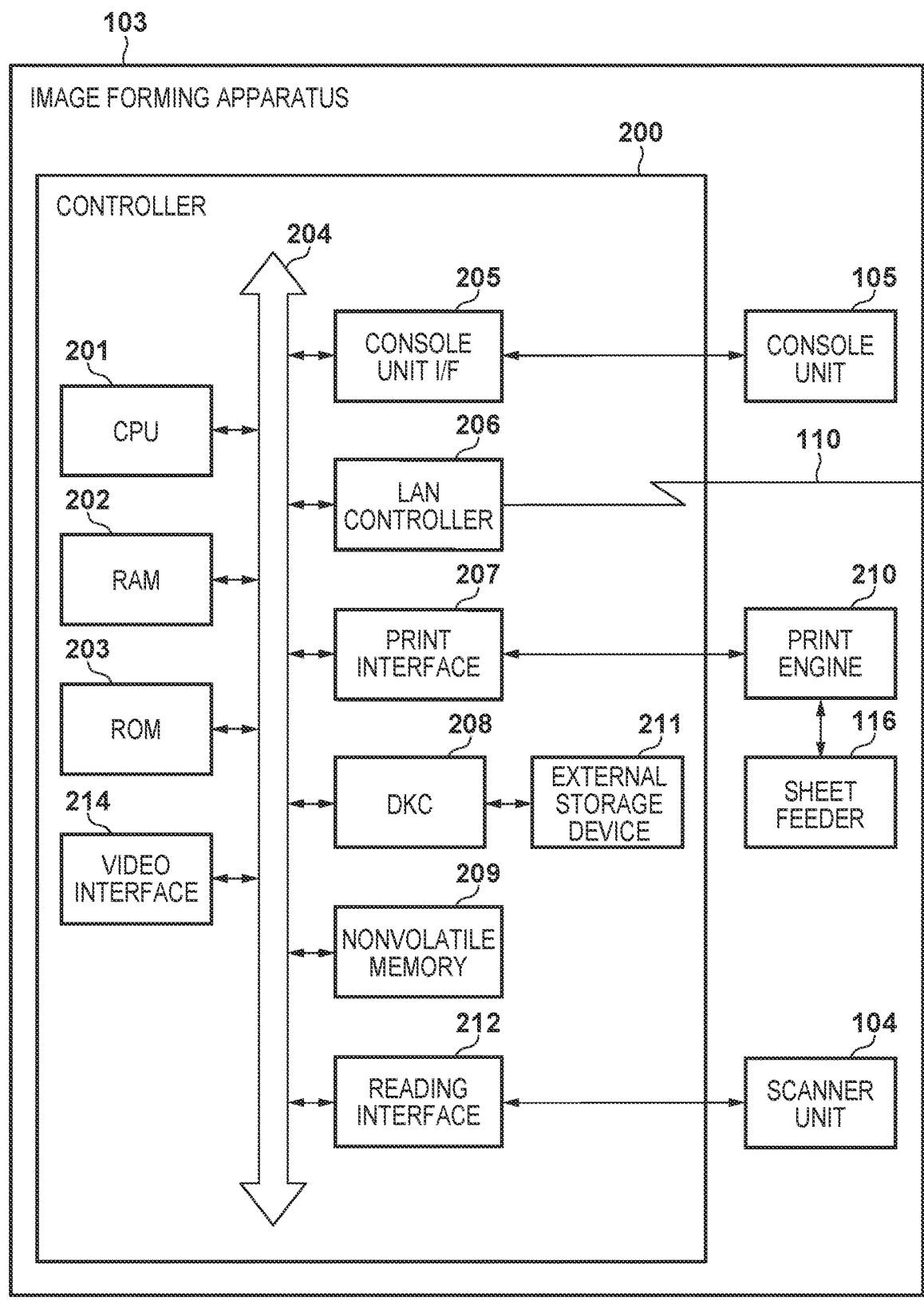
FIG. 2 depicts a block diagram for explaining the hardware arrangement of an image forming apparatus according to the first embodiment.

FIG. 2 is a block diagram for explaining the hardware arrangement of the image forming apparatus 103 according to the first embodiment.

A controller 200 controls the operation of the image forming apparatus 103. A CPU 201 generally controls respective devices connected to a system bus 204 by deploying a program stored in a ROM 203 or an external storage device 211 into a RAM 202 and executing the deployed program. The CPU 201 also outputs an image signal to a print unit (printer engine) 210 connected via a print interface 207 or controls an image signal input from the reading unit (scanner unit) 104 connected via a reading interface 212. The CPU 201 controls the sheet feeder 116 connected to the printer engine 210 via the print interface 207 or obtains the state of the sheet feeder 116. A console unit I/F 205 connects the controller 200 and the console unit 105.

The CPU 201 can communicate with the print control apparatus 102 via a LAN controller 206 and the network 110. The RAM 202 mainly functions as the main memory, work area, or the like of the CPU 201. A disk controller (DKC) 208 controls access to the external storage device 211 such as a hard disk (HDD) or an IC card. The external storage device 211 is used as a job storage area for storing an application program, font data, form data, and the like, or temporarily spooling a print job and externally controlling the spooled job. The external storage device 211 is further used as a data storage area for holding image data input from the scanner unit 104 or image data included in a print job, referring it via a network, and performing printing. In the first embodiment, the HDD is used as the external storage device 211 and holds various logs such as a job log and an image log. The console unit 105 allows the user to input various kinds of information via a software key or a hardware key. A nonvolatile memory 209 stores various kinds of setting information set via the console unit 105 or the network. A video interface 214 receives image data from the print control apparatus 102 via the video cable 107.

Figure 3:
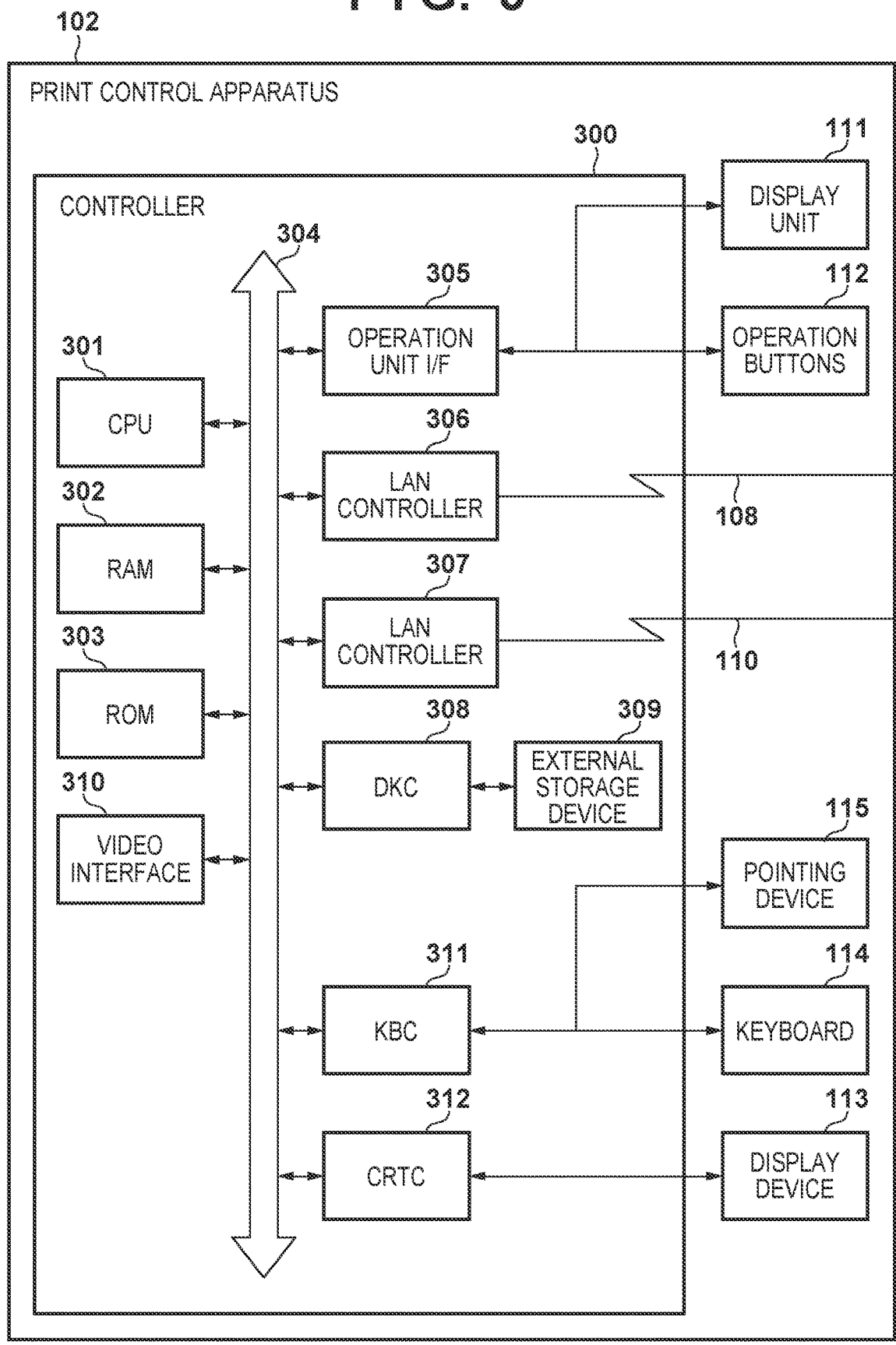
FIG. 3 is a block diagram for explaining the hardware arrangement of a print control apparatus according to the first embodiment.

FIG. 3 is a block diagram for explaining the hardware arrangement of the print control apparatus 102 according to the first embodiment.

The controller 300 controls the operation of the print control apparatus 102. In the controller 300, a CPU 301 generally controls respective units connected to a system bus 304 by deploying a program stored in a ROM 303 or an external storage device 309 into a RAM 302 and executing the deployed program. The CPU 301 can communicate with the image forming apparatus 103 via the control cable 108. The CPU 301 can communicate with the image forming apparatus 103 or the client computer 101 on the network via a LAN controller 307 and the network 110. The CPU 301 can communicate with the image forming apparatus 103 via a LAN controller 306 and the control cable 108. The RAM 302 mainly functions as the main memory, work area, or the like of the CPU 301. A disk controller (DKC) 308 controls access to the external storage device 309 such as a hard disk (HDD) or an IC card. The external storage device 309 stores an application program, font data, form data, and the like or spools a print job temporarily. The external storage device 309 is used as a job storage area for performing RIP (Raster Image Processor) processing on the spooled job and saving the job again. An operation unit I/F 305 controls an interface between the controller 300, and the operation buttons 112 and display unit 111. A video interface 310 transmits image data having undergone RIP processing to the image forming apparatus 103 via the video cable 107. A keyboard controller (KBC) 311 performs processing regarding input of information from the keyboard 114 and the pointing device 115. A display control unit (CRTC) 312 incorporates a video memory, renders image data in the video memory in accordance with an instruction from the CPU 301, and outputs the image data rendered in the video memory as a video signal to the display device 113.

Figure 4A:
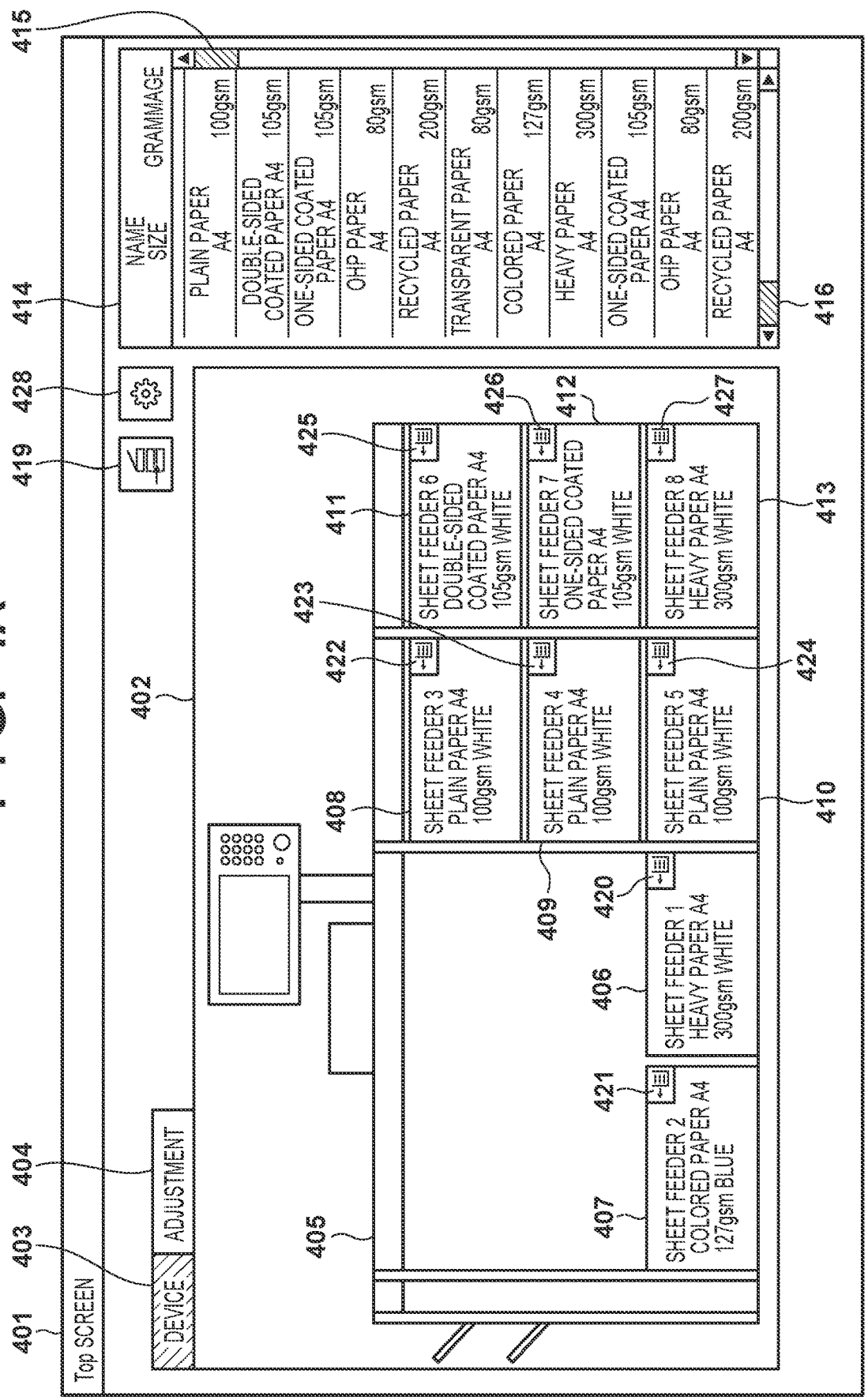

FIGS. 4A and 4B depict views each showing an example of a top screen 401 displayed on the display device 113 by a sheet management application running on the print control apparatus 102 according to the first embodiment. FIG. 4A shows an example of the screen on which information of the sheet feeders 116 available in the image forming apparatus 103 is displayed. FIG. 4B shows an example of the screen on which buttons capable of executing various adjustment settings of the image forming apparatus 103 are displayed.

The top screen 401 of the sheet management application is rendered in the video memory in accordance with an instruction from the CPU 301, and displayed by outputting image data rendered in the video memory as a video signal to the display device 113. A display area 402 is a display area capable of executing tab control. When a device tab 403 is pressed, a screen that displays sheet feeder information of the image forming apparatus 103 can be displayed in the display area 402 (a state in FIG. 4A).

When an adjustment tab 404 is pressed, a screen on which buttons capable of executing various adjustment settings are displayed in the display area 402 can be displayed (a state in FIG. 4B). In FIG. 4A, a display area 405 represents the connection status of hardware options of the image forming apparatus 103 currently connected to the print control apparatus 102.

When the sheet management application is activated, it obtains hardware option information of the image forming apparatus 103 and displays an image as described above in accordance with the option information. FIG. 4A shows a state in which POD (Print on Demand) decks are multilinked and a finisher is connected. Reference numerals 406 to 413 denote sheet feeder buttons (GUI (Graphical User Interface)) each of which corresponds to each sheet feeder and displays identification information of the sheet feeder, information of a sheet set in the sheet feeder, and the like. When the sheet management application is activated, these sheet feeder buttons are created and arranged based on information of the sheet feeders 116 obtained from the image forming apparatus 103.

A sheet list 414 displays a list of pieces of information on sheets that can be used for printing in the image forming apparatus 103. Attribute information of a sheet is represented in the column direction and information of each sheet is represented in the row direction. If the user wants to display information other than the attribute information of the displayed sheet, he/she can display it by operating a slider bar 415. If the user wants to display a sheet other than the displayed sheet, he/she can display it by operating a slider bar 416.

In a display area 417 of FIG. 4B, buttons capable of executing various adjustment settings are arranged, and adjustment items that can be executed by the image forming apparatus 103 are displayed here. The user can cause to display currently hidden adjustment setting items by operating a slider bar 418 to confirm them.

A sheet assignment button 419 in FIG. 4A is a button for respectively assigning sheets to sheet feeders corresponding to the sheet feeder buttons 406 to 413. When the user presses the button 419 while he/she selects a sheet in the sheet list 414, the color of a sheet feeder button corresponding to a sheet feeder capable of setting the selected sheet is changed from a normal state, and the sheet feeder button is highlighted and displayed. By clicking the highlighted sheet feeder button, the user can assign the selected sheet to the sheet feeder corresponding to the sheet feeder button. Setting possible/impossible information of sheet information to the sheet feeder is determined based on information obtained from the image forming apparatus 103.

Sheet feeder open buttons 420 to 427 are buttons for physically opening (pull-out state) sheet feeders respectively corresponding to the buttons. When the user presses one of the sheet feeder open buttons 420 to 427, an open instruction to a sheet feeder corresponding to the pressed button is transmitted to the image forming apparatus 103 via the cable 107. The image forming apparatus 103 receives this instruction and physically opens the target sheet feeder. Note that the sheet feeder open button is arranged for only a feed button corresponding to a sheet feeder capable of receiving an open instruction remotely. When the user presses a setting button 428, a screen for making various settings of the sheet management application, for example, a screen in FIG. 11 (to be described later) appears and he/she makes various settings on this screen.

Figure 5:
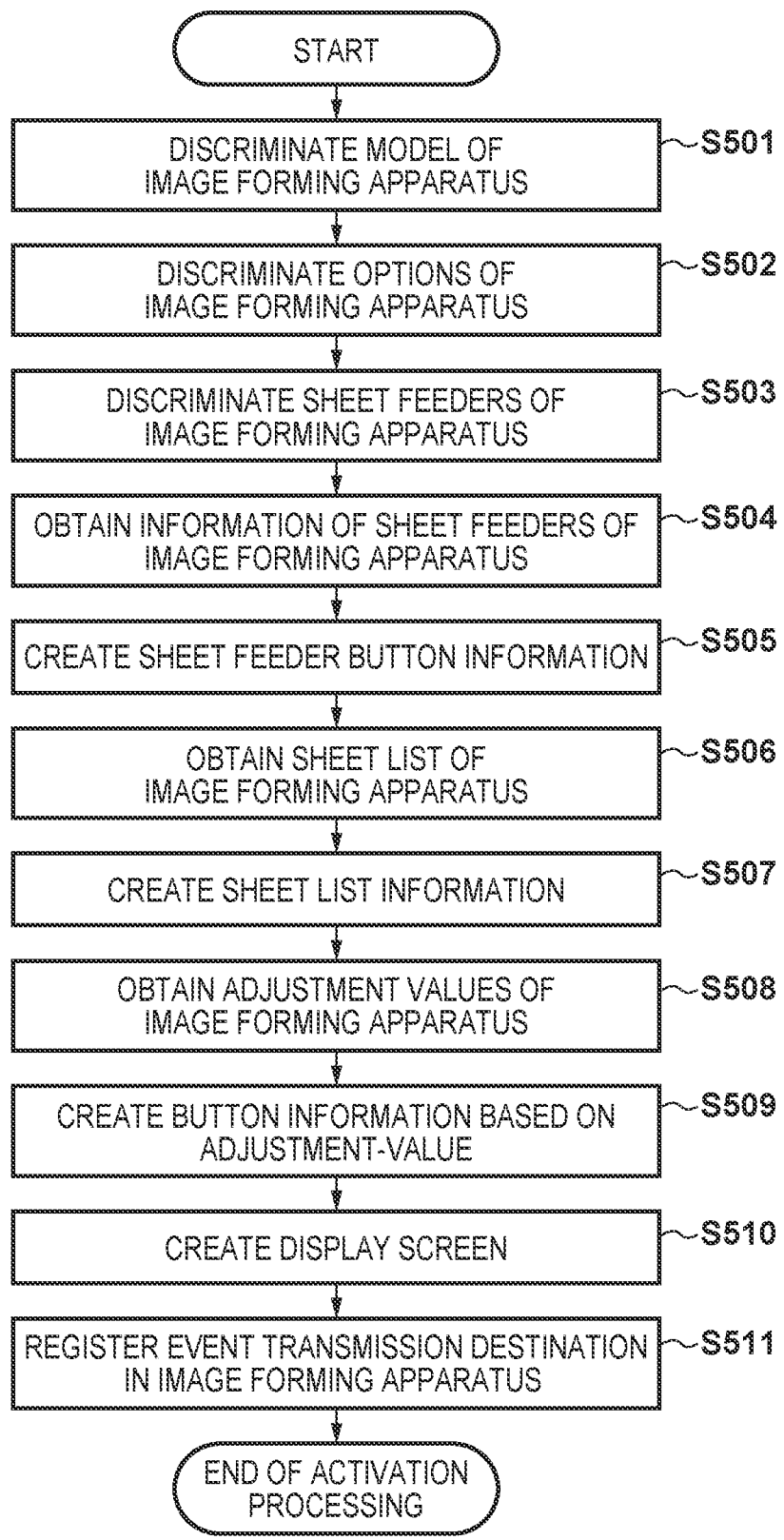
FIG. 5 is a flowchart for describing processing of activating the sheet management application by the print control apparatus and displaying the top screen according to the first embodiment.

FIG. 5 is a flowchart for describing processing of activating the sheet management application by the print control apparatus 102 and displaying the top screen 401 according to the first embodiment. The processing shown in this flowchart is achieved when the CPU 301 deploys a program stored in the external storage device 309 into the RAM 302 and executes it.

First, in step S501, the CPU 301 discriminates the model of the image forming apparatus 103 serving as a sheet management target. The model of the image forming apparatus 103 is discriminated to use the discrimination result when creating the display area 405 of the connection status of hardware options of the image forming apparatus 103 or when absorbing a specification difference between models. At this time, the CPU 301 communicates with the image forming apparatus 103 and obtains model information from information sent back from the image forming apparatus 103. Then, the CPU 301 discriminates the model of the image forming apparatus 103 based on model discrimination information held in advance. The process advances to step S502 in which the CPU 301 communicates with the image forming apparatus 103, obtains information of hardware options of the image forming apparatus 103 from the information sent back from the image forming apparatus 103, and discriminates hardware options connected to the image forming apparatus 103. The CPU 301 uses this discrimination result when creating the display area 405 representing the connection status of hardware options of the image forming apparatus 103, when specifying information of a sheet feeder, or when absorbing a specification difference between models.

The process advances to step S503 in which the CPU 301 communicates with the image forming apparatus 103 and obtains information of sheet feeders of the image forming apparatus 103. The information of sheet feeders includes the arrangement of sheet feeders such as an optional deck, a manual feed tray, and a long-size sheet tray, and information of sheets set in the respective sheet feeders. Further, the CPU 301 discriminates sheet feeders connected to the image forming apparatus 103 serving as a sheet management target and specifies the number of connected sheet feeders. The process advances to step S504 in which the CPU 301 communicates with the image forming apparatus 103 and obtains sheet information and remote open possible/impossible information set for each sheet feeder. The process advances to step S505 in which the CPU 301 creates information of the sheet feeder buttons 406 to 413 to be displayed on the top screen 401. When creating the information of these buttons, the sheet feeder open buttons 420 to 427 are created and arranged on the sheet feeder buttons 406 to 413 for remote open possible sheet feeders. The process advances to step S506 in which the CPU 301 communicates with the image forming apparatus 103 and obtains sheet list information. The process advances to step S507 in which the CPU 301 creates information of the sheet list 414 to be displayed on the top screen 401. Each sheet information of the sheet list includes even setting possible/impossible information of each sheet feeder of the image forming apparatus 103.

The process advances to step S508 in which the CPU 301 communicates with the image forming apparatus 103 and obtains the adjustment values of respective adjustments from information sent back from the image forming apparatus 103 in order to use them for the adjustment buttons in the area 417. After obtaining the adjustment values, the process advances to step S509 in which the CPU 301 creates character strings set in the respective buttons based on the obtained adjustment values. If there is only one adjustment value, this value is displayed (for example, such as "0 mm" in FIG. 4B). If there are two or more adjustment values, adjustment/no adjustment is displayed. Then, the process advances to step S510 in which the CPU 301 creates information of the top screen 401 based on the model hardware option information of the image forming apparatus 103 obtained in steps S501 and S502, the sheet feeder button information created in step S505, the sheet list information created in step S507, and the adjustment button information created in step S509. The process advances to step S511 in which the CPU 301 registers the print control apparatus 102 to be the destination to which to transmit a change notification event that is notified when information of the sheet feeders of the image forming apparatus 103 or sheet information is changed. If the registration is successful, the CPU 301 performs change notification event standby processing. After executing the change notification event standby processing, the activation processing ends.

Note that the processing shown in this flowchart has been described as processing at the time of activating the sheet management application. However, the sheet feeder information, sheet list information, or adjustment values of the image forming apparatus 103 may be changed at any time while the sheet management application is used. Thus, communication between the sheet management application and the image forming apparatus 103 and update of each information accompanying it are performed as needed regardless of which of the sheet management application and the image forming apparatus 103 performs the operation. These pieces of information are synchronized between the sheet management application and the image forming apparatus 103.

Figure 6:
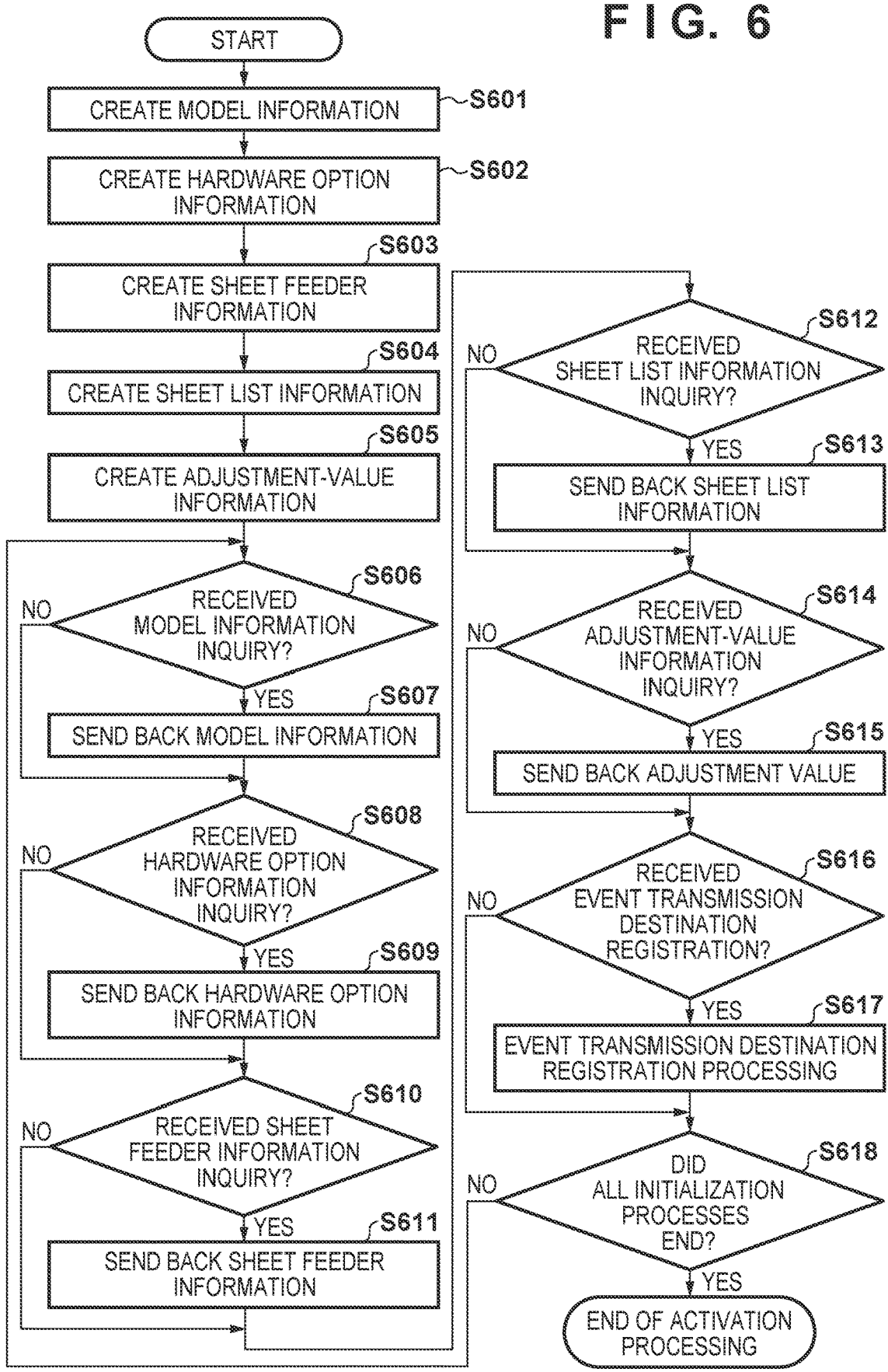
FIG. 6 is a flowchart for describing processing of communicating with the print control apparatus and synchronizing information when activating the image forming apparatus according to the first embodiment.

FIG. 6 is a flowchart for describing processing of communicating with the print control apparatus 102 and synchronizing information when activating the image forming apparatus 103 according to the first embodiment. The processing shown in this flowchart is achieved when the CPU 201 deploys a program stored in the external storage device 211 into the RAM 202 and executes it.

This program starts when the image forming apparatus 103 is activated. First, in step S601, the CPU 201 obtains model information of the image forming apparatus 103 from the external storage device 211 and creates data that can be sent back to the print control apparatus 102. Then, the process advances to step S602 in which the CPU 201 obtains information of hardware options connected to the image forming apparatus 103 from the external storage device 211 and creates data that can be sent back to the print control apparatus 102. The process advances to step S603 in which the CPU 201 obtains hardware option information including information of the sheet feeders of the image forming apparatus 103 from the external storage device 211 and creates data that can be sent back to the print control apparatus 102. The process advances to step S604 in which the CPU 201 obtains sheet list information of the image forming apparatus 103 from the external storage device 211 and creates data that can be sent back to the print control apparatus 102. The process advances to step S605 in which the CPU 201 obtains adjustment-value information of the image forming apparatus 103 from the external storage device 211 and creates data that can be sent back to the print control apparatus 102. The adjustment-value information is obtained for all items adjustable in the image forming apparatus 103.

The process advances to step S606 in which the CPU 201 determines whether an inquiry about model information has been received from the print control apparatus 102. If the inquiry about model information has been received, the process advances to step S607 in which the CPU 201 sends back the model information created in step S601 to the print control apparatus 102, and then advances to step S608. Even if the inquiry about model information has not been received in step S606, the process advances to step S608. The print control apparatus 102 receives and obtains this model information in step S501 of FIG. 5.

In step S608, the CPU 201 determines whether an inquiry about hardware option information has been received from the print control apparatus 102. If the inquiry about hardware option information has been received, the process advances to step S609 in which the CPU 201 sends back the hardware option information created in step S602 to the print control apparatus 102, and then advances to step S610.

Even if the inquiry about hardware option information has not been received in step S608, the process advances to step S610. The print control apparatus 102 receives and obtains the hardware option information in step S502 of FIG. 5.

In step S610, the CPU 201 determines whether an inquiry about information of the sheet feeders has been received from the print control apparatus 102. If the inquiry about information of the sheet feeders has been received, the process advances to step S611. In step S611, the CPU 201 sends back the information of the sheet feeders created in step S603 to the print control apparatus 102, and the process advances to step S612. Even if the inquiry about the information of the sheet feeders has not been received in step S610, the process advances to step S612. The print control apparatus 102 receives and obtains the information of the sheet feeders in steps S503 and S504 of FIG. 5.

In step S612, the CPU 201 determines whether an inquiry about sheet list information has been received from the print control apparatus 102. If the inquiry about sheet list information has been received, the process advances to step S613 in which the CPU 201 sends back the sheet list information created in step S604 to the print control apparatus 102, and then advances to step S614. Even if the inquiry about sheet list information has not been received in step S612, the process shifts to step S614. The print control apparatus 102 receives and obtains the sheet list information in step S505 of FIG. 5.

In step S614, the CPU 201 determines whether an inquiry about adjustment-value information has been received from the print control apparatus 102. If the inquiry about adjustment-value information has been received, the process advances to step S615 in which the CPU 201 sends back the adjustment-value information created in step S605 to the print control apparatus 102, and then the process advances to step S616. Even if the inquiry about adjustment-value information has not been received in step S614, the process advances to step S616. The print control apparatus 102 receives and obtains the adjustment-value information in step S508 of FIG. 5.

In step S616, the CPU 201 determines whether a request to register transmission destination information for when transmitting an event upon change of the state of the image forming apparatus 103 has been received from the print control apparatus 102. If the request has been received, the process advances to step S617. In step S617, the CPU 201 adds the print control apparatus 102 to a transmission destination of an event, and the process shifts to step S618. Even if the request to register a transmission destination for an event has not been received in step S616, the process shifts to step S618. If the CPU 201 determines in step S618 that all the processes in steps S606, S608, S610, S612, S614, and S616 are successful, the CPU 201 determines to end initialization processing and ends this processing. If not all these steps are successful, the process advances to step S606. Note that the sheet feeders 116 in the first embodiment are merely an example of sheet feeders, the sheet feeders may be sheet feeders of other mechanisms such as an inserter and a manual feed tray, and their forms are not limited.

A description will be given referring back to FIGS. 4A and 4B. For example, when the user indicates the sheet feeder button 406 corresponding to sheet feeder 1 with the pointing device 115 on the top screen 401 of FIG. 4A, a sheet setting screen for sheet feeder 1 appears. On this screen, the user can set a sheet in the sheet feeder 1 and change the set value of the set sheet. This also applies to the sheet feeder buttons 407 to 413 and a description thereof will not be repeated. Although not described in detail in the first embodiment, the sheet feeders include all sheet feeding devices such as an inserter and a manual feed tray. In the following description, a description that the pointing device 115 is used at the time of operating an application, for example, at the time of pressing a button will be omitted, but the application is operated using such an input device, as a matter of course.

Figure 7A:
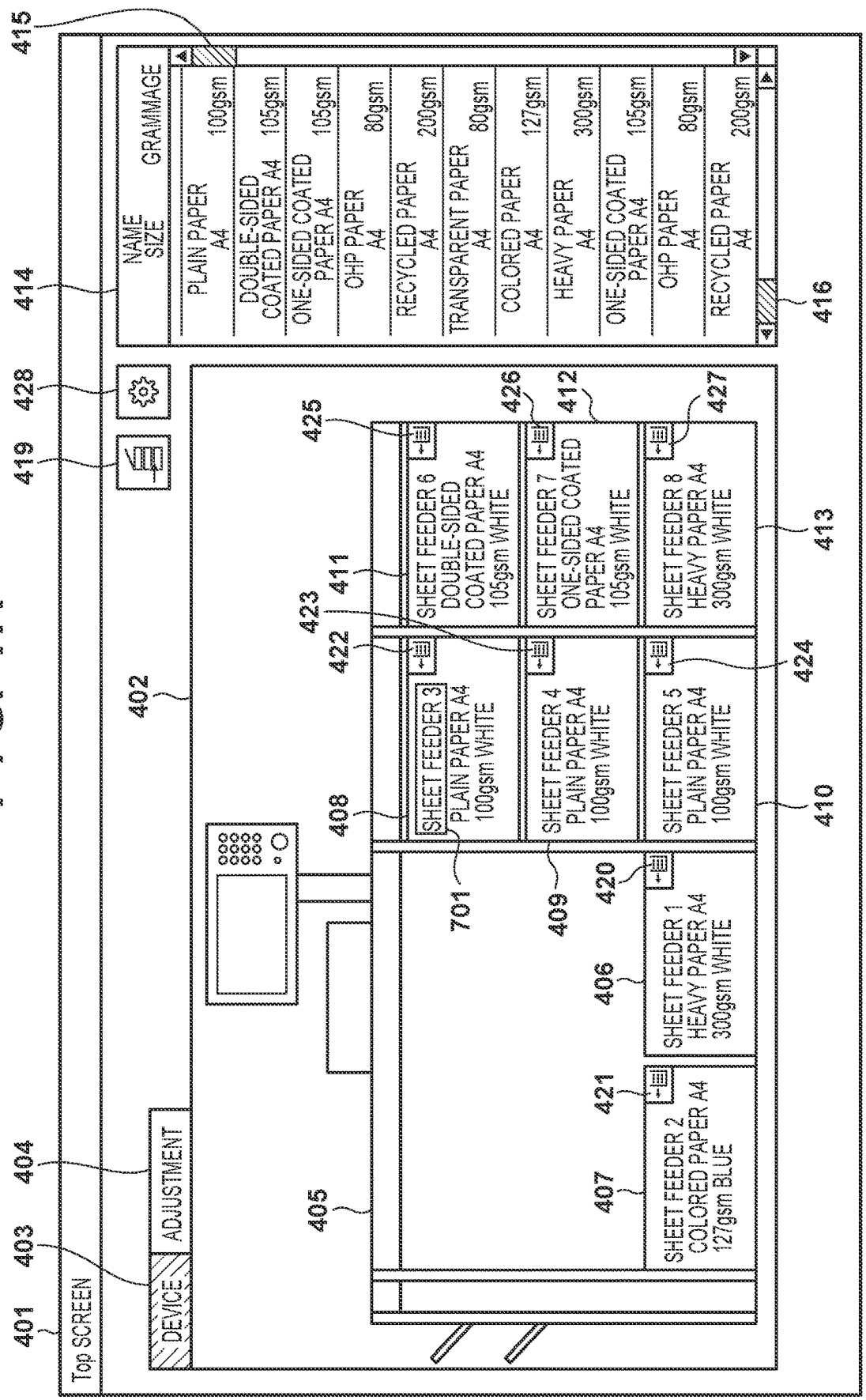
FIGS. 7A and 7B depict views each showing another example of the top screen displayed on the display device by the sheet management application running on the print control apparatus according to the first embodiment.
Figure 7B:
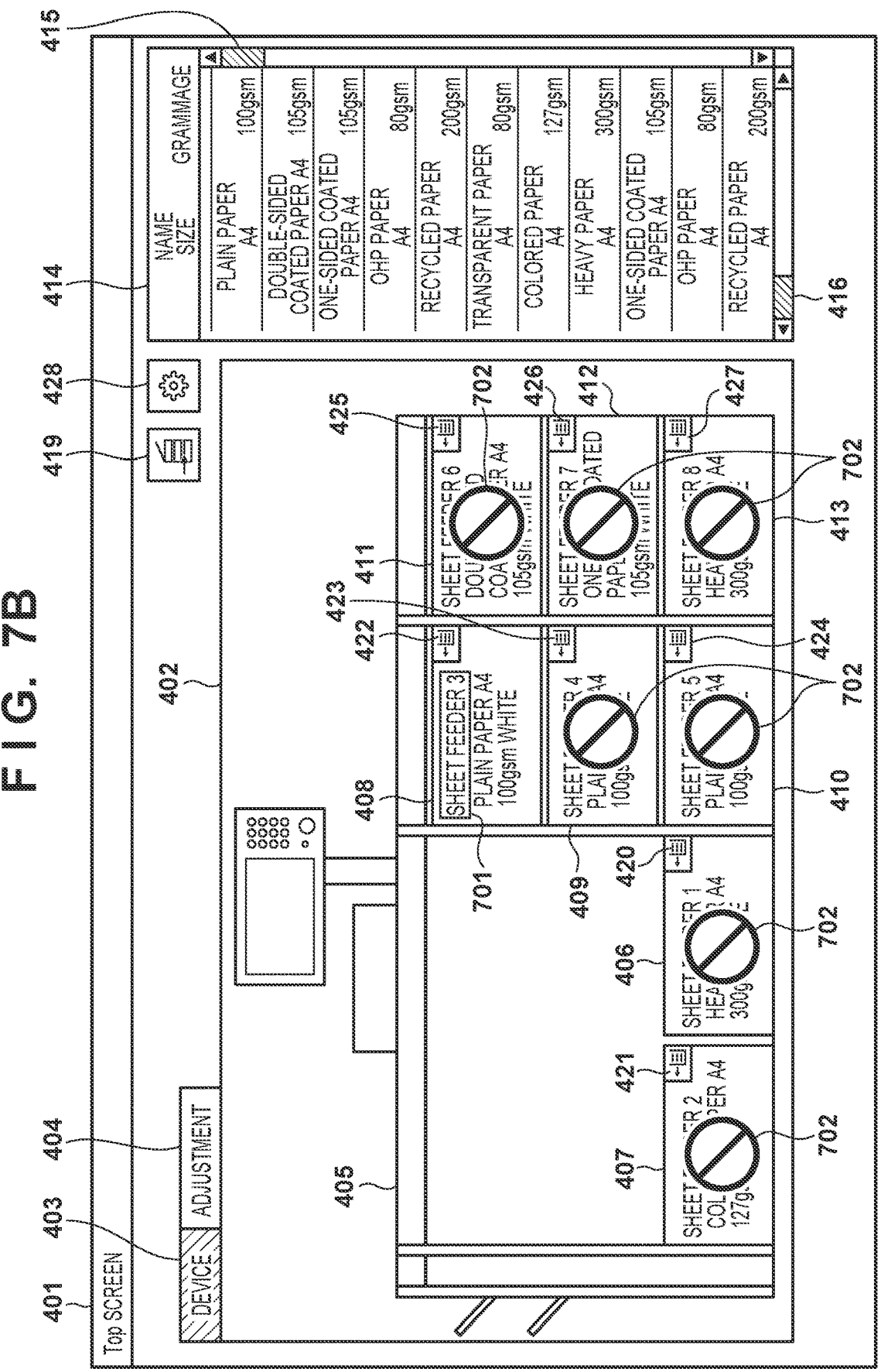

FIGS. 7A and 7B depict views each showing another example of the top screen 401 displayed on the display device 113 by the sheet management application running on the print control apparatus 102 according to the first embodiment. In FIGS. 7A and 7B, the same reference numerals as those in FIGS. 4A and 4B denote the same parts, and a description thereof will not be repeated.

FIG. 7A shows an example of the screen on which information of the sheet feeders of the image forming apparatus 103 is displayed. The names (identification information) of the respective sheet feeders are displayed on the sheet feeder buttons 406 to 413. For example, "sheet feeder 3" is displayed on the sheet feeder button 408, as represented in an area 701. When the user wants to always feed a sheet supplied in "sheet feeder 3" and print, he/she clicks the area 701 representing "sheet feeder 3". In response to this, the print control apparatus 102 sends this information to the image forming apparatus 103, and the image forming apparatus 103 changes to a state in which a sheet is fed from only "sheet feeder 3", in other words, a state in which no sheet can be fed from the remaining sheet feeders.

FIG. 7B shows a screen on which the feed possible state and feed impossible state of the sheet feeders are displayed. For example, when the user clicks the area 701 to feed a sheet stored in "sheet feeder 3", icons 702 representing the feed impossible state are displayed on the sheet feeder buttons 406, 407, and 409 to 413 corresponding to the remaining sheet feeders. To the contrary, the icon 702 is not displayed on the sheet feeder button 408 representing "sheet feeder 3" and the feed possible state is represented. In this manner, a sheet feeder button corresponding to a sheet feeder serving as a feed target and sheet feeder buttons corresponding to the remaining sheet feeders are displayed distinctively.

Figure 8B:
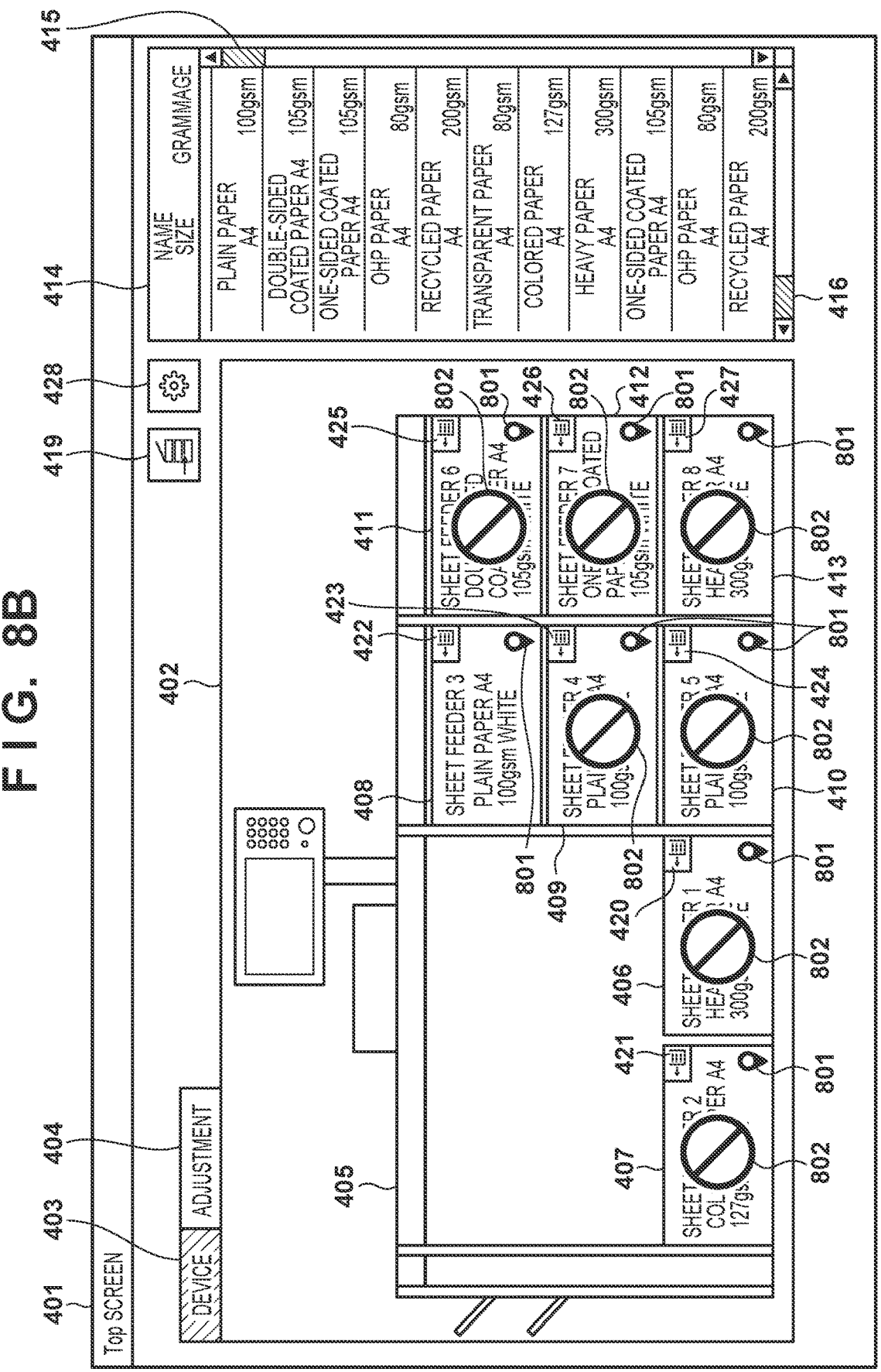

FIGS. 8A and 8B depict views each showing still another example of the top screen 401 displayed on the display device 113 by the sheet management application running on the print control apparatus 102 according to the first embodiment. In FIGS. 8A and 8B, the same reference numerals as those in FIGS. 4A and 4B denote the same parts, and a description thereof will not be repeated.

FIG. 8A shows an example of the screen on which information of the sheet feeders of the image forming apparatus 103 is displayed. An icon 801 for designating feed of a sheet from a specific sheet feeder is arranged on each of the sheet feeder buttons 406 to 413. When the user wants to always feed a sheet stored in "sheet feeder 3" and print, he/she designates the icon 801 of the sheet feeder button 408 corresponding to "sheet feeder 3". In response to this, the print control apparatus 102 sends this information to the image forming apparatus 103, and the image forming apparatus 103 changes to a state in which a sheet can be fed from only "sheet feeder 3", in other words, a state in which no sheet can be fed from the remaining sheet feeders.

FIG. 8B shows an example of the screen on which the feed possible state and feed impossible state of the sheet feeders are displayed. For example, the user designates the icon 801 of the sheet feeder button 408 corresponding to sheet feeder 3 in order to feed a sheet stored in "sheet feeder 3". Then, icons 802 representing the feed impossible state are displayed on the sheet feeder buttons 406, 407, and 409 to 413 corresponding to sheet feeders other than "sheet feeder 3". To the contrary, the icon 802 is not displayed on the sheet feeder button 408 corresponding to "sheet feeder 3" and the feed possible state is represented.

Figure 9:
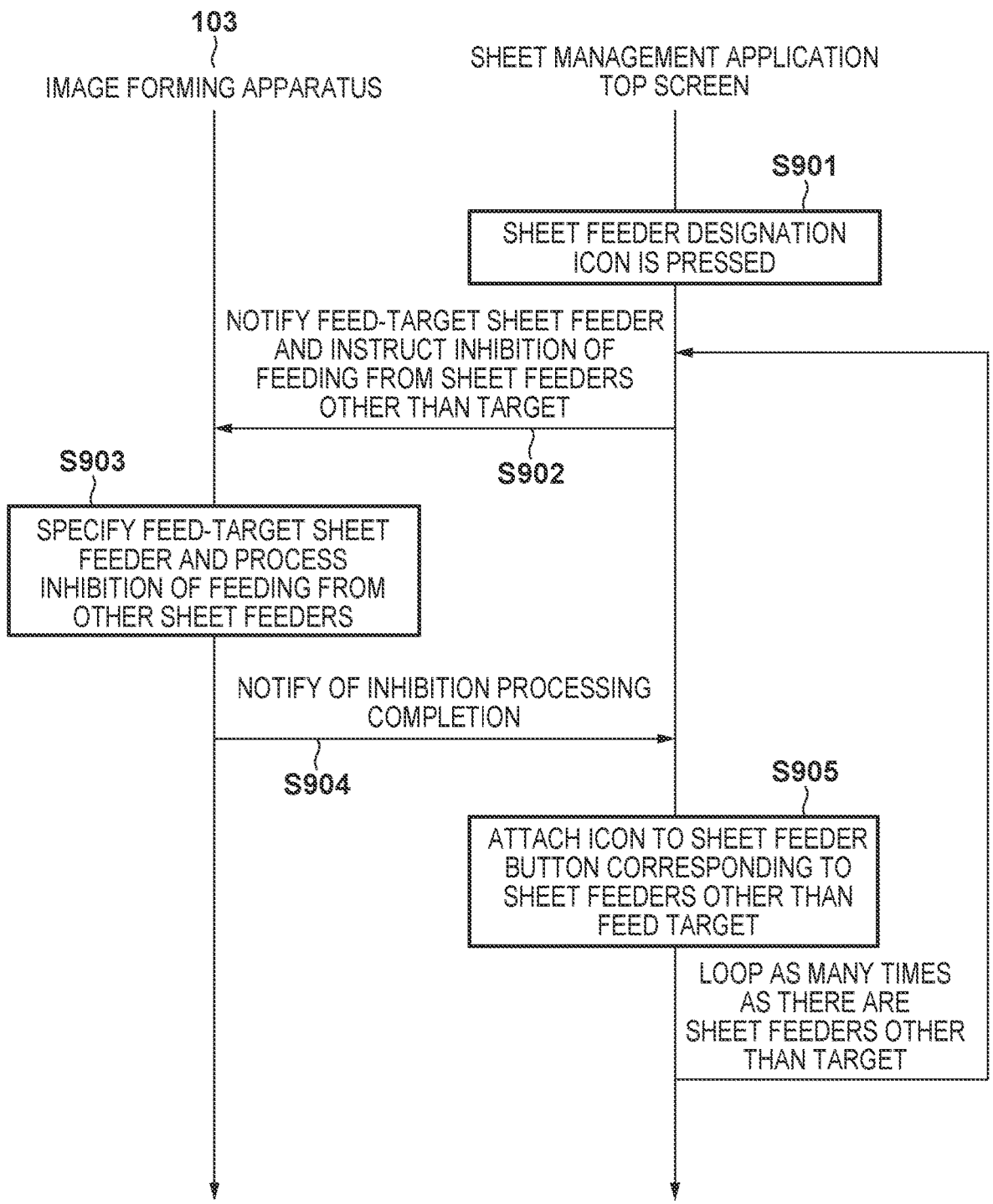
FIG. 9 is a sequence chart for explaining exchange of information between the image forming apparatus and the top screen of the sheet management application running on the print control apparatus according to the first embodiment.

FIG. 9 is a sequence chart for explaining exchange of information between the image forming apparatus 103 and the top screen 401 of the sheet management application running on the print control apparatus 102 according to the first embodiment.

First, in step S901, a sheet feeder designation icon, for example, the area 701 in FIGS. 7A and 7B or the icon 801 in FIGS. 8A and 8B described above is clicked in the sheet management application. In step S902, the sheet management application notifies the image forming apparatus 103 of a sheet feeder designated as a sheet feeder for feeding a sheet, and gives an instruction to inhibit feed from the remaining sheet feeders.

In step S903, the image forming apparatus 103 enables sheet feed from the sheet feeder serving as a feed target designated by the sheet management application, and performs feed inhibition processing on the remaining sheet feeders. As a result, no sheet is fed from the sheet feeders having undergone the feed inhibition processing in the image forming apparatus 103.

In step S904, after the completion of the feed inhibition processing on the designated sheet feeders, the image forming apparatus 103 notifies the sheet management application of the completion. In step S905, the sheet management application displays the feed possible state on a sheet feeder button corresponding to the sheet feeder serving as a feed target. On the other hand, the sheet management application displays the feed impossible state on sheet feeder buttons corresponding to sheet feeders other than the sheet feeder serving as a feed target. That is, the sheet management application displays the icon 702 in FIG. 7B or the icon 802 in FIG. 8B described above on a sheet feeder button corresponding to a sheet feeder other than the feed target. The series of processes, that is, the processes in steps S902 to S905 are performed repeatedly as many times as there are sheet feeders of the image forming apparatus 103.

Note that the image forming apparatus 103 executes in step S903 the processing of inhibiting feed from sheet feeders other than the sheet feeder serving as the feed target. Alternatively, for example, sheet feeders other than the sheet feeder serving as the feed target may be opened in step S903. This mechanically inhibits feed of a sheet from sheet feeders other than the sheet feeder serving as the feed target.

Figure 10:
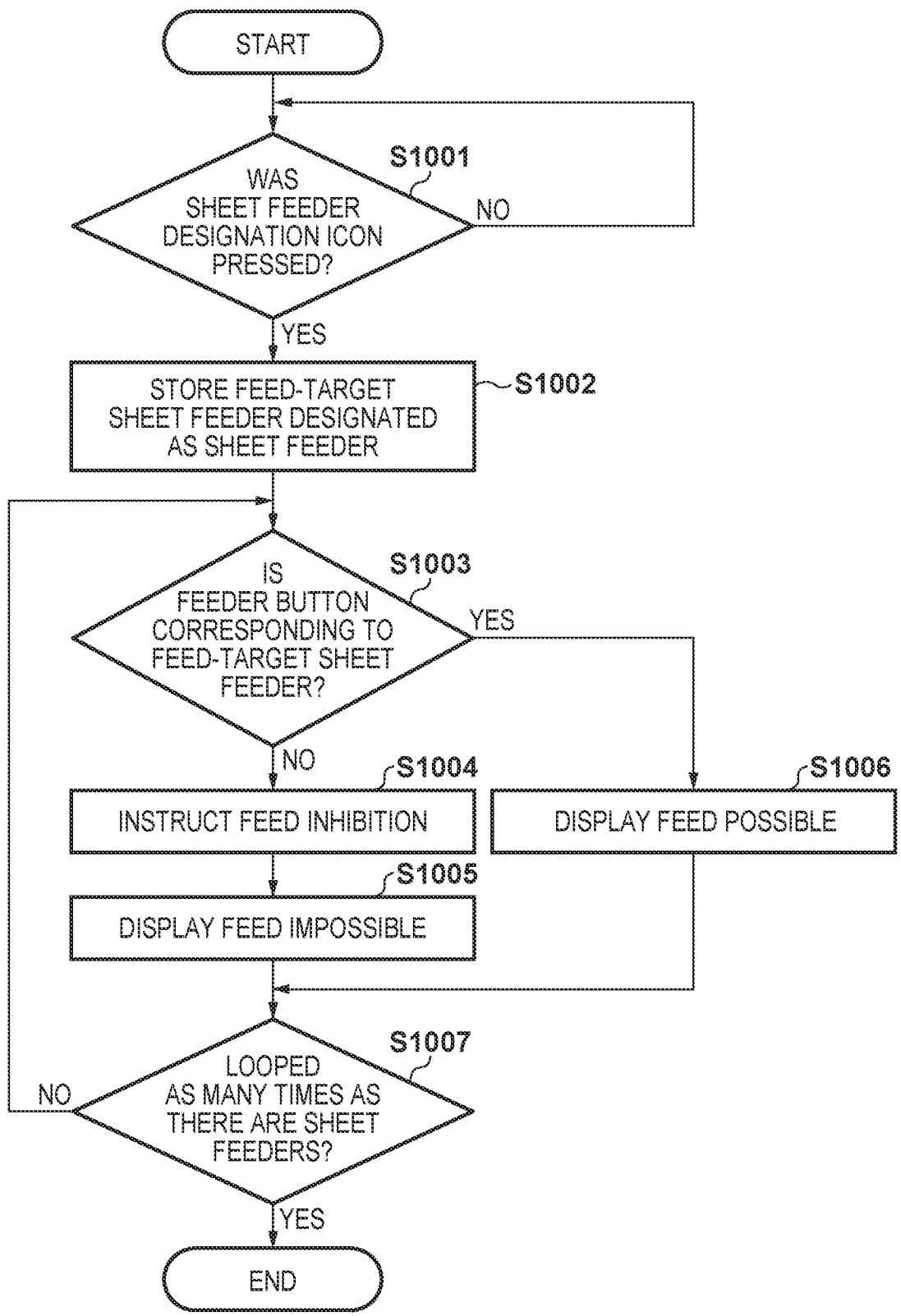
FIG. 10 is a flowchart for describing processing when an icon for designating a sheet feeder is pressed while the top screen is displayed in the print control apparatus according to the first embodiment.

FIG. 10 is a flowchart for describing processing when the area 701 or the icon 802 for designating a sheet feeder is pressed while the top screen 401 is displayed on the print control apparatus 102 according to the first embodiment. Note that the processing shown in this flowchart is achieved when the CPU 301 deploys a program stored in the external storage device 309 into the RAM 302 and executes it.

First, in step S1001, the CPU 301 determines whether or not the sheet feeder designation icon, for example, the area 701 in FIG. 7A or the icon 801 in FIG. 8A has been designated. If the CPU 301 determines that the sheet feeder designation icon has been designated, the process advances to step S1002 in which the CPU 301 stores a sheet feeder corresponding to the designated sheet feeder button as a sheet feeder serving as the feed target, and then advances to step S1003. If the CPU 301 determines in step S1001 that the sheet feeder designation icon has not been designated, it executes step S1001 continuously.

In step S1003, the CPU 301 determines whether or not each sheet feeder button is a sheet feeder button corresponding to the sheet feeder serving as the feed target for which the area 701 or the icon 801 has been clicked. If the CPU 301 determines that the sheet feeder button is not the sheet feeder button whose area 701 or icon 801 has been clicked, the process advances to step S1004 in which the CPU 301 instructs the image forming apparatus 103 to inhibit feed from a sheet feeder corresponding to the sheet feeder button determined not to be the sheet feeder button whose area 701 or icon 801 has been clicked. In response to this, the image forming apparatus 103 performs feed inhibition processing on the designated sheet feeder. As a result, no sheet is fed from the sheet feeder having undergone the feed inhibition processing in the image forming apparatus 103. Note that sheet feed from sheet feeders corresponding to sheet feeder buttons other than the sheet feeder button whose area 701 or icon 801 has been clicked is inhibited in step S1004. Alternatively, for example, an instruction may be given in step S1004 to open sheet feeders corresponding to sheet feeder buttons other than the sheet feeder button whose area 701 or icon 801 has been clicked. This can prevent sheet feed from sheet feeders corresponding to sheet feeder buttons other than the sheet feeder button whose area 701 or icon 801 has been clicked.

Thereafter, the process advances to step S1005 in which the CPU 301 receives from the image forming apparatus 103 a completion notification of the feed inhibition processing on sheet feeders other than the sheet feeder serving as the feed target, and displays the feed impossible state on sheet feeder buttons corresponding to the sheet feeders other than the sheet feeder serving as the feed target. Then, the process advances to step S1007. In this case, the icons 702 in FIG. 7B or the icons 802 in FIG. 8B are displayed on these sheet feeder buttons, and the process advances to step S1007.

If the CPU 301 determines in step S1003 that the sheet feeder button is a sheet feeder button corresponding to the sheet feeder serving as the feed target whose area 701 or icon 801 has been clicked, the process advances to step S1006 in which the CPU 301 displays the sheet feeder button in the feed possible state, and then advances to step S1007. In step S1007, the CPU 301 determines whether the series of processes, that is, the processes in steps S1003 to S1006 have been executed repeatedly as many times as there are sheet feeders of the image forming apparatus 103. If the CPU 301 determines that these processes have not been executed repeatedly as many times as there are sheet feeders, the process returns to step S1003. If the CPU 301 determines that these processes have been executed repeatedly as many times as there are sheet feeders of the image forming apparatus 103, the process ends.

Next, print processing by the image forming apparatus 103 according to the embodiment will be described.

FIG. 14 is a flowchart for describing print processing by the image forming apparatus 103 according to the embodiment. Note that the processing shown in this flowchart is achieved when the CPU 201 deploys a program stored in the external storage device 211 into the RAM 202 and executes it. This print processing is common to the first embodiment and the second embodiment to be described later.

First, in step S1401, the CPU 201 determines whether or not a print job has been received from the print control apparatus 102. If a print job has been received, the process advances to step S1402 in which the CPU 201 sets "1" in a variable n for specifying a sheet feeder. Note that the variable n is provided in the RAM 202. Then, the process advances to step S1403 in which the CPU 201 determines whether a sheet feeder represented by the variable n can feed a sheet. Whether sheet feed is possible is determined based on whether this sheet feeder is designated as a sheet feeder serving as the feed target and sheets are stored in the sheet feeder serving as the feed target in step S903 of FIG. 9 and step S1004 of FIG. 10.

If the CPU 201 determines that this sheet feeder can is able to feed a sheet, the process advances to step S1404 in which the CPU 201 stores this sheet feeder as a "sheet feeder capable of feed" representing the feed target in the RAM 202 temporarily during processing of the print job. The process then advances to step S1405. If the CPU 201 determines in step S1403 that this sheet feeder is not a sheet feeder capable of feed, the process advances to step S1405. In step S1405, the CPU 201 determines whether or not the value of the variable n is equal to a maximum number m of sheet feeders connected to the image forming apparatus 103. If the value of the variable n is not equal to the maximum number m, the CPU 201 increments the value of the variable n by one in step S1406, and then the process returns to step S1403.

If the CPU 201 determines in step S1405 that the value of the variable n is equal to the maximum number m, the process advances to step S1407 in which the CPU 201 analyzes the print job received in step S1401. In step S1407, the CPU 201 analyzes the print job and specifies a sheet feeder used for printing. In some cases, the print job includes information that designates a sheet feeder to be used. If the print job includes the information that designates a sheet feeder, it is determined whether in the RAM 202 stores the designated sheet feeder as a sheet feeder capable of feed. If in the RAM 202 stores the sheet feeder designated by the print job, the CPU 201 sets this sheet feeder as a sheet feeder used for printing. If the sheet feeder designated by the print job is not stored in the RAM 202, the CPU 201 temporarily stops execution of the print job and displays on the console unit 105 a screen representing that the designated sheet feeder cannot be used. A paper size or paper type used in the print job is sometimes designated. The paper type is a paper attribute such as plain paper, heavy paper, or glossy paper. If a paper size or type used in the print job is designated, the CPU 201 selects, as a sheet feeder used for the print job from available sheet feeders, a sheet feeder for which a paper size or paper type coincident with the paper size or type designated by the print job is set. If the RAM 202 does not store a sheet feeder for which the paper size or type designated by the print job is set, the CPU 201 displays on the console unit 105 a screen representing that a sheet feeder for which sheets of the paper size or paper type designated by the print job are set cannot be used. After that, the process advances to step S1408 in which the CPU 201 starts printing based on the print job. The process advances to step S1409 in which the CPU 201 feeds a sheet from the sheet feeder serving as a feed target designated as a "sheet feeder capable of feed" in step S1404. In the embodiment, only one sheet feeder serving as the feed target is explicitly designated by the UI, so only one sheet feeder is designated as a "sheet feeder capable of feed".

As described above, according to the first embodiment, a sheet feeder for supplying a sheet to be used in printing is able to be reliably designated from a plurality of sheet feeders of the image forming apparatus by a simple operation, and feed from the remaining sheet feeders can be inhibited.

Second Embodiment

In the above-described first embodiment, when the icon of a sheet feeder button is clicked on the top screen 401, a sheet feeder corresponding to the sheet feeder button is set as a sheet feeder serving as the feed target and the remaining sheet feeders are changed to the feed impossible state. However, once the sheet feeder serving as the feed target is designated, the state in which only this sheet feeder serving as the feed target can feed a sheet continues subsequently and this may hamper print operations.

In the second embodiment, it is also considered to prevent forgetting to cancel designation of a sheet feeder serving as the feed target. When a predetermined condition is satisfied, control is performed to return sheet feeders in the feed impossible state to the feed possible state. Note that the hardware arrangements of an image forming apparatus 103 and a print control apparatus 102 and the arrangement of a system including them according to the second embodiment are the same as those according to the above-described first embodiment and a description thereof will not be repeated.

Figure 11:
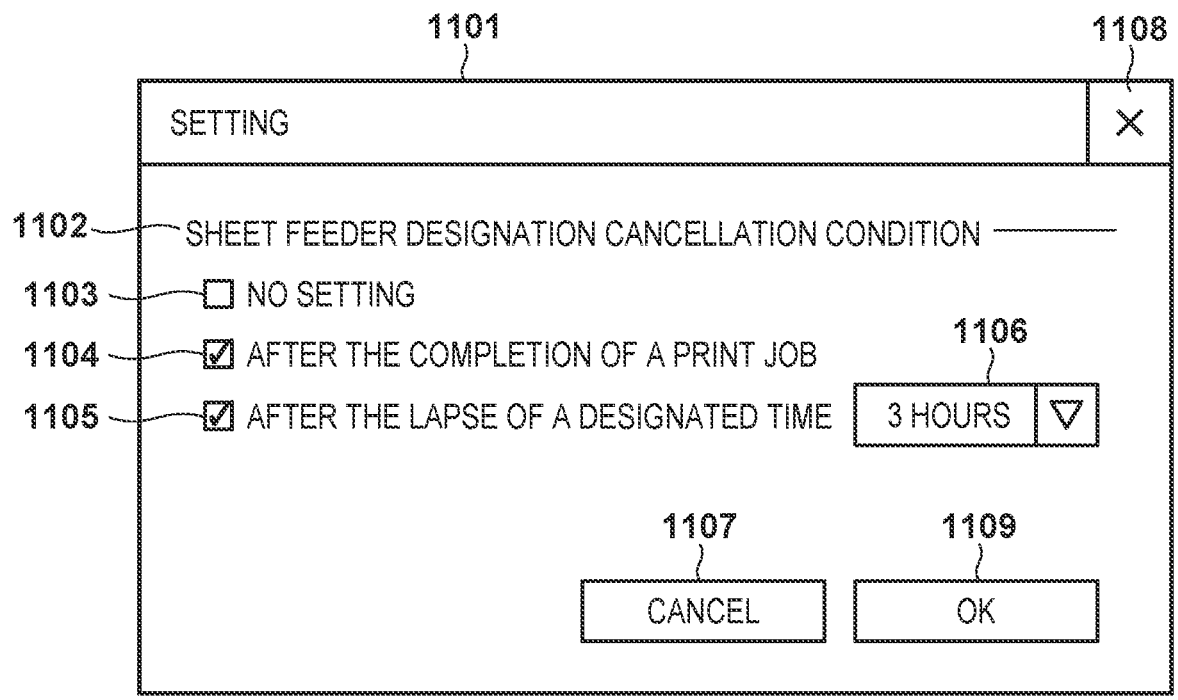
FIG. 11 depicts a view showing an example of a setting screen displayed by a sheet management application in a print control apparatus according to the second embodiment.

FIG. 11 depicts a view showing an example of a setting screen displayed by a sheet management application in the print control apparatus 102 according to the second embodiment. This screen appears when a user clicks a setting button 428 on a top screen 401 in FIG. 4A.

A setting screen 1101 includes a sheet feeder designation cancellation condition menu 1102, choices 1103 to 1106, a cancel button 1107, a close button 1108, and an OK button 1109. When the user clicks the cancel button 1107 or the close button 1108, information selected with the choices 1103 to 1106 is not saved in the sheet management application, settings are disabled, and the setting screen 1101 ends. In contrast, when the user clicks the OK button 1109, information selected with the choices 1103 to 1106 is saved in the sheet management application, the selected settings are enabled, and the setting screen 1101 ends.

The sheet feeder designation cancellation condition menu 1102 lists the choices 1103 to 1106 configured to return sheet feeders in the feed impossible state to the feed possible state again. The first choice 1103 is "no setting". When the choice 1103 is checked, the sheet management application sets a sheet feeder serving as the feed target in the feed impossible state only when another sheet feeder is designated as the feed target with a sheet feeder designation icon.

The second choice 1104 is "after the completion of a print job". When the choice 1104 is selected, the sheet management application performs control to automatically return a sheet feeder serving as the feed target to the feed impossible state after the completion of a print job in a print system 100.

The third choice 1105 is "after the lapse of a designated time". When the choice 1105 is selected, the sheet management application performs control to automatically return a sheet feeder serving as the feed target to the feed impossible state after the lapse of a time set in the time 1106, for example, "3 hours".

Figure 12:
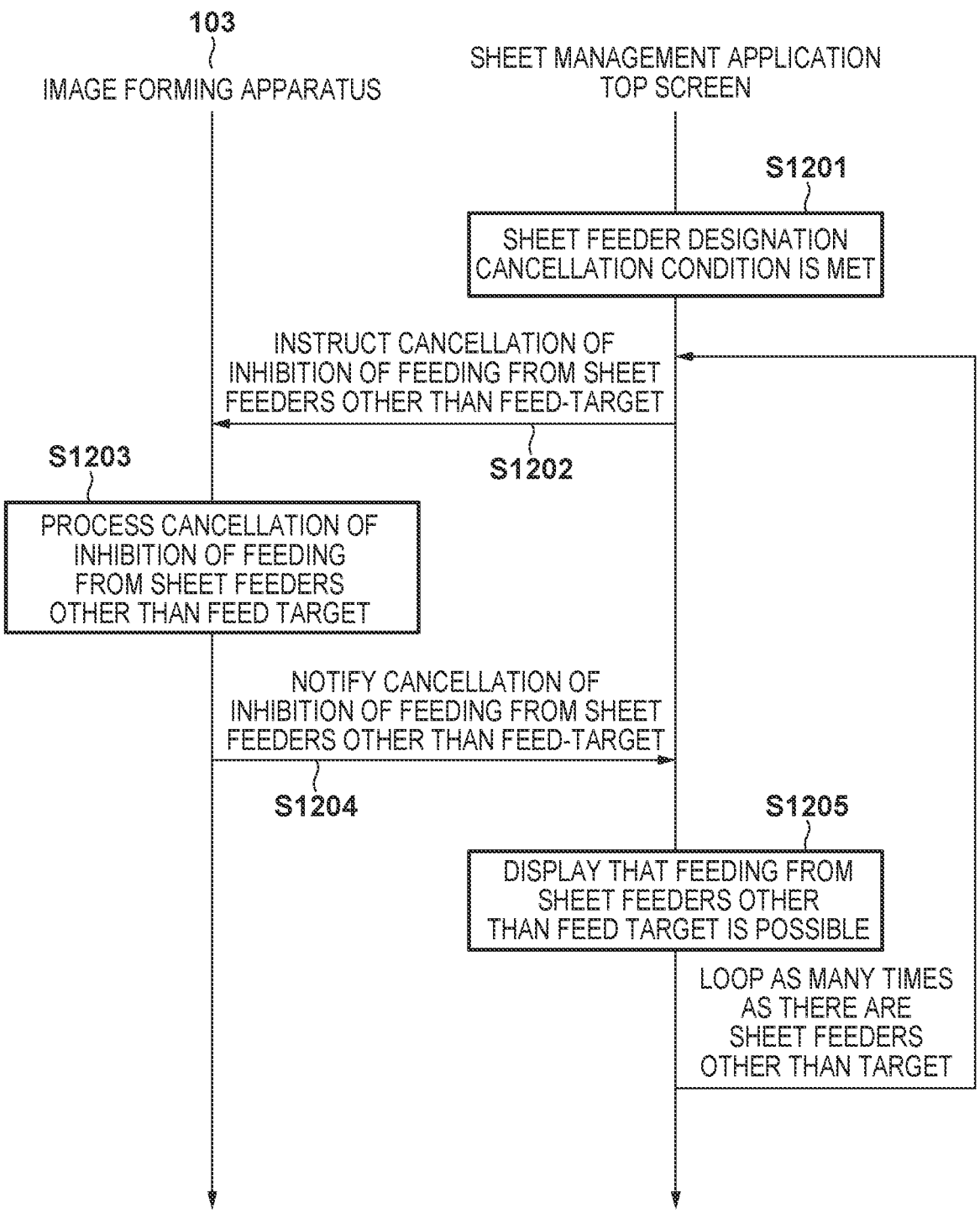
FIG. 12 is a sequence chart showing exchange of information between an image forming apparatus and the top screen of the sheet management application running on the print control apparatus according to the second embodiment.

FIG. 12 is a sequence chart showing exchange of information between the image forming apparatus 103 and the top screen 401 of the sheet management application running on the print control apparatus 102 according to the second embodiment.

In step S1201, it is determined whether or not a condition to cancel designation of a sheet feeder, which is set in the sheet feeder designation cancellation condition menu 1102 of the setting screen 1101, is met. If the condition is met, the sheet management application performs processing in step S1202. In step S1202, the print control apparatus 102 instructs the image forming apparatus 103 to cancel inhibition of sheet feed from sheet feeders other than the sheet feeder serving as the feed target. Then, in step S1203, the image forming apparatus 103 cancels inhibition of sheet feed from sheet feeders other than the sheet feeder serving as the feed target in accordance with the feed inhibition cancellation instruction given by the sheet management application. As a result, sheet feeders having undergone the feed inhibition cancellation processing is able to feed a sheet in the image forming apparatus 103. In step S1204, after the completion of the feed inhibition cancellation processing on the designated sheet feeders, the image forming apparatus 103 notifies the sheet management application of the completion.

In step S1205, the sheet management application displays a sheet feeder button corresponding to the sheet feeder serving as the feed target in the feed possible state subsequently. Also, in step S1205, the sheet management application displays, in the feed possible state, sheet feeder buttons corresponding to the sheet feeders other than the sheet feeder serving as the feed target. That is, an icon 702 in FIG. 7B or an icon 802 in FIG. 8B described above is hidden, and the top screen of the sheet management application shown in FIG. 4A described above is displayed. In other words, neither the icon 702 nor the icon 802 is displayed. The series of processes is performed repeatedly as many times as there are sheet feeders of the image forming apparatus 103. After that, the process ends.

When a sheet feeder corresponding to a specific sheet feeder button out of sheet feeder buttons 406 to 413 is in the feed impossible state before a sheet feeder serving as the feed target is designated, the sheet management application stores information of the sheet feeder in advance. Even after the above-mentioned designation of the sheet feeder serving as the feed target is canceled, only this sheet feeder keeps the feed impossible state subsequently based on the stored information.

Figure 13:
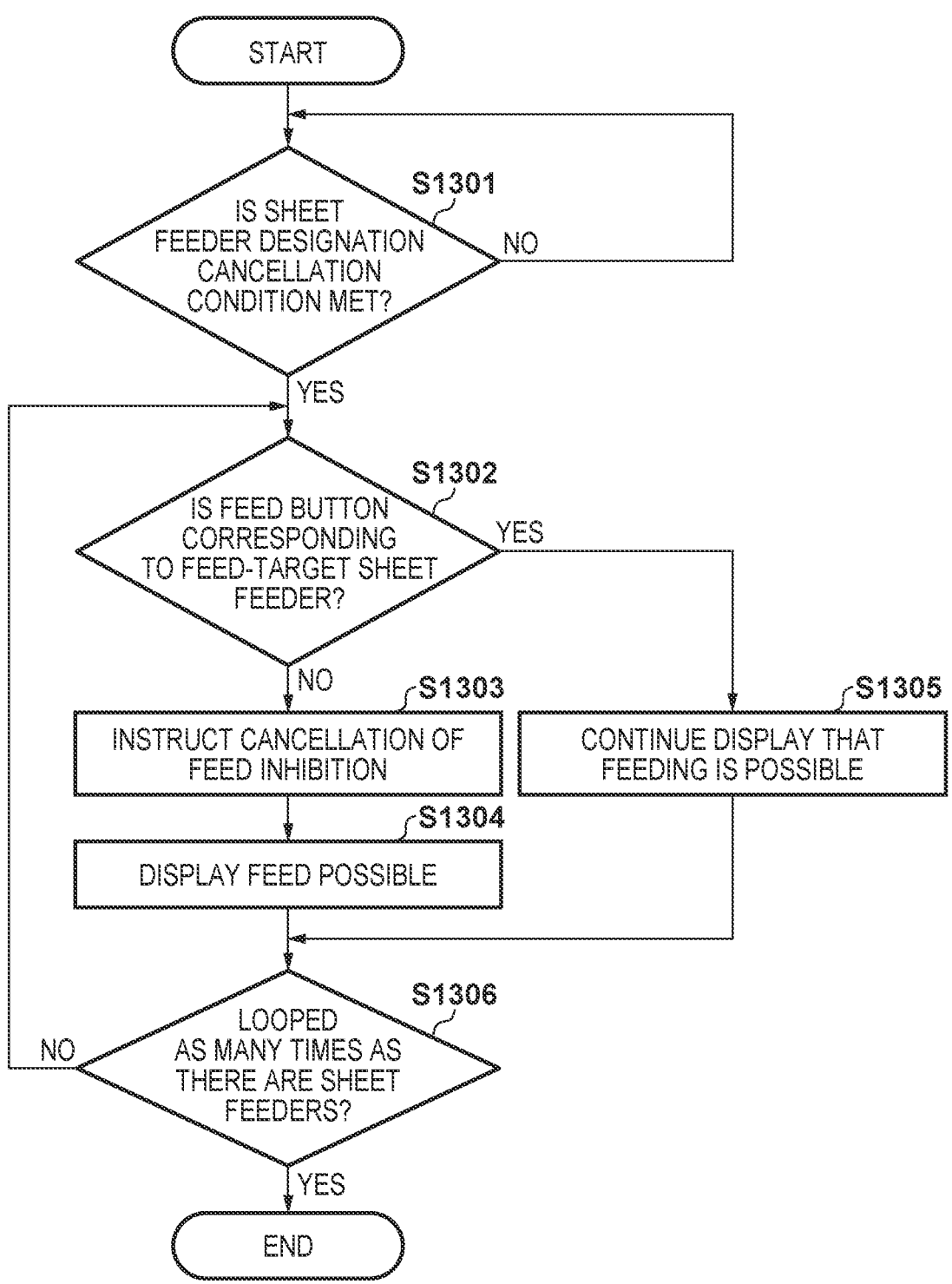
FIG. 13 is a flowchart for describing processing by the print control apparatus according to the second embodiment.

FIG. 13 is a flowchart for explaining processing by the print control apparatus 102 according to the second embodiment. Note that the processing shown in this flowchart is achieved when a CPU 301 deploys a program stored in an external storage device 309 into a RAM 302 and executes it.

First, in step S1301, the CPU 301 determines whether or not any of sheet feeder designation cancellation conditions set in the sheet feeder designation cancellation condition menu 1102 of the setting screen 1101 is met. If the CPU 301 determines that any of sheet feeder designation cancellation conditions is met, the process advances to step S1302 in which the CPU 301 determines whether or not each sheet feeder button is a sheet feeder button corresponding to a sheet feeder serving as the feed target. If the CPU 301 determines in step S1301 that no sheet feeder designation cancellation condition is met, it subsequently determines in step S1301 whether or not a sheet feeder designation cancellation condition is met. If the CPU 301 determines in step S1302 that the sheet feeder button is not a sheet feeder button corresponding to a sheet feeder serving as the feed target, the process advances to step S1303 in which the CPU 301 instructs the image forming apparatus 103 to enable sheet feed from the corresponding sheet feeder. The image forming apparatus 103 performs feed inhibition cancellation processing on the sheet feeder designated by the sheet management application. Hence, the sheet feeder having undergone the feed inhibition cancellation processing is able to feed a sheet again in the image forming apparatus 103. Thereafter, the process advances to step S1304 in which the CPU 301 hides the icons 702 and 802 of the sheet feeder button, and then advances to step S1306.

If the CPU 301 determines in step S1302 that the sheet feeder button is a sheet feeder button corresponding to a sheet feeder serving as the feed target, the process advances to step S1305 in which the CPU 301 displays the sheet feeder button corresponding to the sheet feeder in the feed possible state subsequently, and then advances to step S1306. In step S1306, the CPU 301 determines whether the series of processes, that is, the processes in steps S1302 to S1305 have been executed repeatedly as many times as there are sheet feeders of the image forming apparatus 103. If the CPU 301 determines that the series of processes has been executed repeatedly as many times as there are sheet feeders of the image forming apparatus 103, the process ends; otherwise, returns to step S1302.

As described above, according to the second embodiment, a sheet feeder for supplying a sheet to be used in printing can be reliably designated from a plurality of sheet feeders of the image forming apparatus by a simple operation, and feed from the remaining sheet feeders can be inhibited. Further, it can be prevented that a sheet feeder designated as a feed target remains the feed target. This can improve the productivity in print operations.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-074040, filed Apr. 6, 2018, which is hereby incorporated by reference herein in its entirety.

What is claimed is:

1. A print control apparatus that controls a print apparatus, the print control apparatus comprising:
   a display;
   a memory device storing instructions; and
   at least one processor that implements the instructions to execute a plurality of tasks, including:

a display control task that causes the display to display pieces of identification information of a plurality of sheet feeders available in the print apparatus; and a designation task that designates inhibition of feeding from sheet feeders other than a sheet feeder corresponding to identification information selected by a user among the displayed pieces of identification information of the plurality of sheet feeders, wherein the display control task further causes the display to identifiably display the pieces of identification information corresponding to the sheet feeders other than the selected sheet feeder corresponding to the selected identification information.

2. The print control apparatus according to claim 1, wherein the plurality of tasks include a notification task that notifies the print apparatus of:
the selected sheet feeder as a feeding source of a sheet; and
the inhibited sheet feeders, different from the selected sheet feeder, inhibited from sheet feeding.

3. The print control apparatus according to claim 1, wherein:
the display control task further causes the display to display a list of pieces of sheet information settable in the plurality of sheet feeders, and
the plurality of tasks include a first setting task that, when sheet information is selected from the list and the identification information is selected, sets the selected sheet information in the sheet feeder corresponding to the selected identification information.

4. The print control apparatus according to claim 3, wherein the plurality of tasks include:
a second setting task that sets a cancellation condition to cancel the selection of the selected sheet feeder; and
a cancellation task that cancels the selection of the selected sheet feeder when the set cancellation condition is satisfied.

5. The print control apparatus according to claim 4, wherein the cancellation condition includes one of an end of a print job or a lapse of a predetermined time.

6. The print control apparatus according to claim 1, wherein the identification information includes sheet information set in a corresponding sheet feeder.

7. The print control apparatus according to claim 1, wherein when an icon representing the identification information is designated, the designation task designates a sheet feeder corresponding to the selected identification information as a sheet feeder selected by the user.

8. The print control apparatus according to claim 1, wherein the display control task causes the display to further display, with predetermined icons, the pieces of identification information corresponding to the sheet feeders other than the selected sheet feeder.

9. A print apparatus comprising:
a display;
a printer engine;
a memory device storing instructions; and
at least one processor that implements the instructions to execute a plurality of tasks, including:
a display control task that causes the display to display pieces of identification information of a plurality of sheet feeders available in the print apparatus;
a first setting task that sets, as a feeding source of a sheet, a sheet feeder corresponding to identification information designated by a user among the displayed pieces of identification information, and inhibits feeding from sheet feeders other than the set sheet feeder; and
a control task that causes the printer engine to execute printing by feeding a sheet from the set sheet feeder,
wherein the display control task further causes the display to identifiably display the pieces of identification information corresponding to the inhibited sheet feeders other than the set sheet feeder.

10. The print apparatus according to claim 9, wherein the display control task causes the display to display the pieces of identification information corresponding to the inhibited sheet feeders, other than the set sheet feeder, by adding icons representing a feed impossible state.

11. The print apparatus according to claim 10, wherein:
the display control task causes the display to display a list of pieces of sheet information settable in the plurality of sheet feeders, and
the plurality of tasks include a second setting task that, when sheet information is selected from the list and the identification information is designated, sets the selected sheet information to the set sheet feeder.

12. The print apparatus according to claim 10, wherein the plurality of tasks include:
a second setting task that sets a cancellation condition to cancel the setting of the set sheet feeder; and
a cancellation task that cancels the setting of the set sheet feeder when the set cancellation condition is satisfied.

13. The print apparatus according to claim 12, wherein the cancellation condition includes one of an end of a print job or a lapse of a predetermined time.

14. The print apparatus according to claim 9, wherein the identification information includes sheet information set in a corresponding sheet feeder.

15. The print apparatus according to claim 9, wherein when one of a predetermined area of the identification information or an icon included in the identification information is designated, the setting task sets the sheet feeder corresponding to the designated identification information as the feeding source.

16. A method of controlling a print control apparatus that controls a print apparatus, the method comprising:
displaying pieces of identification information of a plurality of sheet feeders available in the print apparatus; and
designating inhibition of feeding from sheet feeders other than a sheet feeder corresponding to identification information selected by a user among the displayed pieces of identification information of the plurality of sheet feeders,
wherein the displaying further identifiably displays the pieces of identification information corresponding to the sheet feeders other than the selected sheet feeder corresponding to the selected identification information.

17. A method of controlling a print apparatus, the method comprising:
displaying pieces of identification information of a plurality of sheet feeders available in the print apparatus;
setting, as a feeding source of a sheet, a sheet feeder corresponding to identification information designated by a user among the displayed pieces of identification information, and inhibiting feeding from sheet feeders other than the set sheet feeder; and
executing printing by feeding a sheet from the set sheet feeder, wherein the displaying further identifiably displays the pieces of identification information corresponding to the inhibited sheet feeders other than the set sheet feeder.

18. A non-transitory computer readable storage medium storing a program executable by a processor to execute a method of controlling a print control apparatus that controls a print apparatus, the method comprising:

displaying pieces of identification information of a plurality of sheet feeders available in the print apparatus; and designating inhibition of feeding from sheet feeders other than a sheet feeder corresponding to identification information selected by a user among the displayed pieces of identification information of the plurality of sheet feeders, wherein the displaying further identifiably displays the pieces of identification information corresponding to the sheet feeders other than the sheet feeder corresponding to the selected identification information.

19. A non-transitory computer readable storage medium storing a program for causing a processor to execute a method of controlling a print apparatus, the method comprising:

displaying pieces of identification information of a plurality of sheet feeders available in the print apparatus;

setting, as a feeding source of a sheet, a sheet feeder corresponding to identification information designated by a user among the displayed pieces of identification information, and inhibiting feeding from sheet feeders other than the set sheet feeder; and executing printing by feeding a sheet from the set sheet feeder, wherein the displaying further identifiably displays the pieces of identification information corresponding to the inhibited sheet feeders other than the set sheet feeder.

* * * * *